(12) United States Patent
Takahashi et al.

(10) Patent No.: US 6,195,432 B1
(45) Date of Patent: *Feb. 27, 2001

(54) SOFTWARE DISTRIBUTION SYSTEM AND SOFTWARE UTILIZATION SCHEME FOR IMPROVING SECURITY AND USER CONVENIENCE

(75) Inventors: Toshinari Takahashi, Tokyo; Hiroyasu Nogami, Kanagawa, both of (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/814,538

(22) Filed: Mar. 10, 1997

(30) Foreign Application Priority Data

Mar. 11, 1996 (JP) .................................................. 8-053407

(51) Int. Cl.⁷ ......................................................... H04L 9/12
(52) U.S. Cl. ................................ 380/9; 380/278; 380/284
(58) Field of Search ............................... 380/25, 21, 278, 380/283, 284; 395/650

(56) References Cited

U.S. PATENT DOCUMENTS

| | | | | |
|---|---|---|---|---|
| Re. 36,310 | * | 9/1999 | Bjerrum et al. | 380/25 |
| 4,200,770 | | 4/1980 | Hellman et al. | 178/22 |
| 4,405,829 | | 9/1983 | Rivest et al. | 178/22.1 |
| 5,809,145 | * | 9/1998 | Silk et al. | 380/25 |
| 5,812,666 | * | 9/1998 | Baker et al. | 380/21 |

* cited by examiner

Primary Examiner—Thomas R. Peeso
Assistant Examiner—Todd Jack
(74) Attorney, Agent, or Firm—Foley & Lardner

(57) ABSTRACT

A software distribution system and a software utilization scheme for effectively preventing an illegal copy or a software is difficult while improving a convenience of a user. At a user side, a shared key to be shared between a software provider and a user is stored, where the shared key has a guaranteed correspondence with an ID information regarding a payment of a software fee by the user. Then, a desired software is requested to the software provider, and the desired software is received in an encrypted form from the software provider. The desired software received from the software provider is then decrypted by using the shared key stored at the user side, and the desired software in a decrypted form is utilized at the user side.

20 Claims, 15 Drawing Sheets

FIG.4

USER INFORMATION 105

| REGISTRATION ORDER | ID | SHARED KEY | CREDIT CARD NUMBER | PRIVATE INFORMATION |
|---|---|---|---|---|
| 1 | 3425608 | 6827641 | 22-52-6643 | TARO YAMADA,TOKYO… |
| 2 | 2162430 | 3287621 | 21-66-3225 | HANAKO YAMADA,FUKUOKA… |
| 3 | 3352762 | 5562387 | 44-32-2152 | ICHIRO SUZUKI,TOKYO… |
| 4 | 4625187 | - | - | |
| 5 | 8613215 | 8903214 | - | JIRO SATO,AKITA… |
| 6 | 4892314 | 2292362 | 21-62-3315 | ICHIRO TAKAHASHI,TOKYO… |
| 7 | 4452361 | 6473219 | 33-25-4111 | HIROSHI MAEDA,AKITA… |
| --- | | | | |

FIG.9

| REGISTRATION ORDER | SHARED KEY | PURCHASE KEY | PERSONAL INFORMATION | |
|---|---|---|---|---|
| | | | CREDIT CARD NUMBER | PRIVATE INFORMATION |
| 1 | 3425608 | 6827641 | 22-52-6643 | TARO YAMADA,TOKYO··· |
| 2 | 2162430 | 3287621 | 21-66-3225 | HANAKO YAMADA,FUKUOKA··· |
| 3 | 3352762 | 5562387 | 44-32-2152 | ICHIRO SUZUKI,TOKYO··· |
| 4 | 4625187 | - | - | - |
| 5 | 8613215 | 8903214 | - | JIRO SATO,AKITA··· |
| 6 | 4892314 | 2292362 | 21-62-3315 | ICHIRO TAKAHASHI,TOKYO··· |
| 7 | 4452361 | 6473219 | 33-25-4111 | HIROSHI MAEDA,AKITA··· |
| --- | | | | |

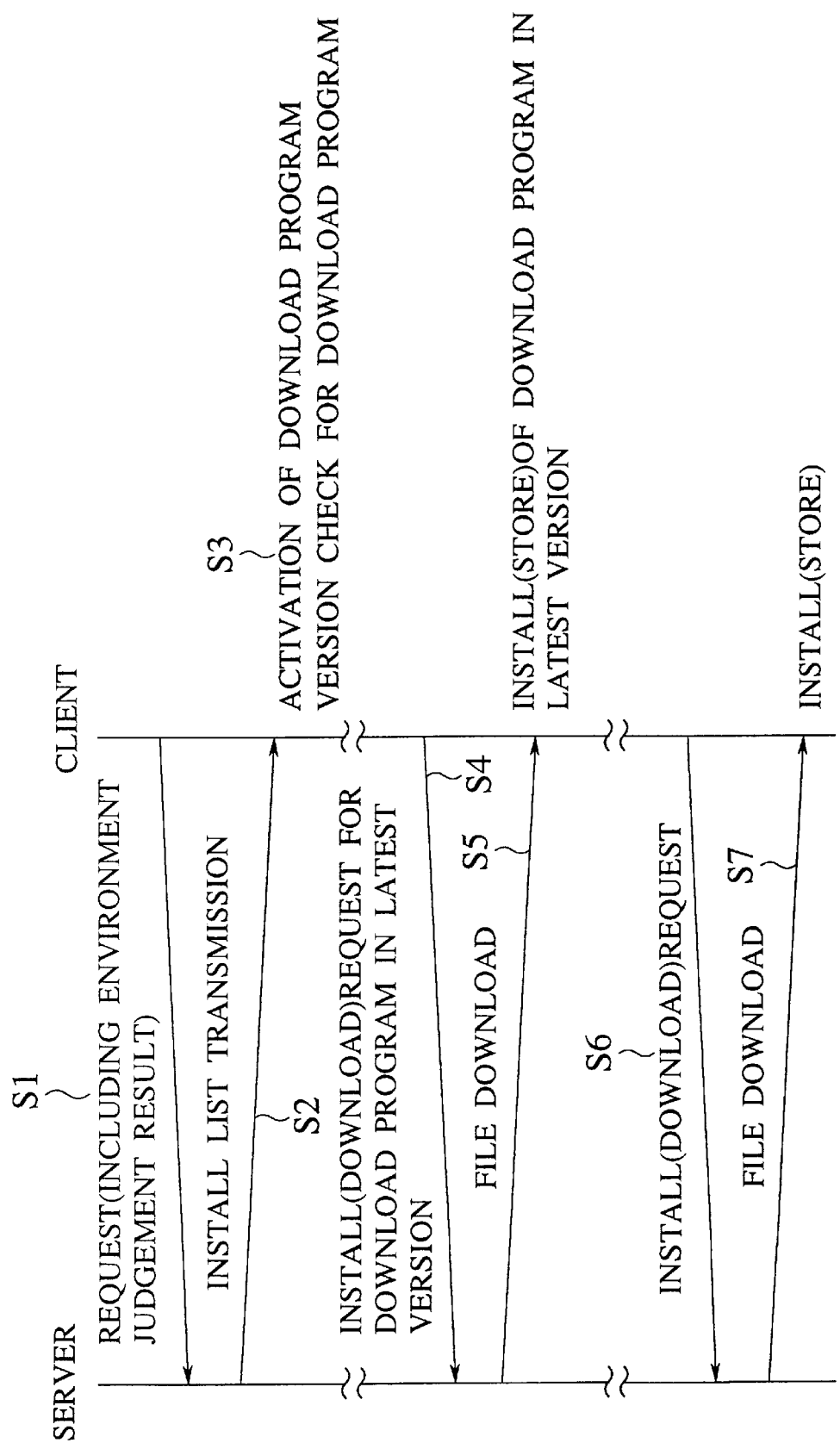

FIG.14

```
HTTP/1.0 200 Document follows
Date: Mon.15 Jul 1996 02:42:04 GMT
Server: NCSA/1.4                    471
Content-type: application/ABC
Last-modified: Mon.15 Jul 1996 02:40:51 GMT
Content-length: a number of data in entire request
(automatically entered by server)
```
} HEADER PORTION

```
Download-veraion: 1 (latest version of download program
Download-URL: (URL of server)
COMMAND 1
COMMAND 2
(commands are sequentially read up to content-length)
```
} DATA PORTION

FIG.15

| install | funcname | pathname | size1-1  size1-2 .. size1-n | size2 |

COMMAND TYPE — FILE SPECIFICATION — DIVISION SPECIFICATION — TOTAL CAPACITY OF FILE

FIG.16 install DIC MT/1/dic2..3.sp1 512000 512000 139000 7439000

SOFTWARE DISTRIBUTION SYSTEM AND SOFTWARE UTILIZATION SCHEME FOR IMPROVING SECURITY AND USER CONVENIENCE

BACKGROUND OF THE INVENTION

1. Field of the Invention

The present invention relates to a system for distributing software products and a scheme for utilizing distributed software products.

2. Description of the Background Art

Due to the spread of computers and computer networks, it is now possible to realize the software distribution entirely electronically, without utilizing the conventional trade system based on cash payment.

The major problem in the software distribution now is how to specify a person who is trying to acquire the software and charge this person safely at a time of distributing the software that can be rather easily copied.

Conventionally, a charging mechanism on the computer network has utilized the authentication technique based on the cryptography. For example, in a case of notifying a credit card number on the computer network, it has been necessary to encrypt the credit card number and transfer the encrypted credit card number so that a third person cannot obtain the credit card number illegally by wiretapping the communication line.

On the other hand, a scheme for preventing an illegal copy has also been developed. The most frequently employed scheme is to apply some encryption to the software so that only a person who has a key (a cipher key, a password, etc.) for decrypting encrypted data can obtain the actual content of the software. However, in this scheme, it is still possible to make an illegal copy of the software by illegally copying the key or password itself.

As it has been quite difficult to resolve all these problems completely by means of the software alone, there has been a proposition of a system called super-distribution which presumes a use of some special hardware. Namely, this is a system which uses a hardware functioning a black box that outputs some output data in response to an entered input data, while a content of this hardware itself cannot be analyzed even by the owner of this hardware. For example, it is possible to realize a scheme in which the encrypted data cannot be decrypted unless this function of a black box is available, by means of the conventional cryptographic technique such as the public key cryptosystem.

However, this scheme is not very practical because it is necessary for every customer to have his own dedicated hardware and utilize this hardware all the times. In addition, even if this scheme is employed, it is not going to be able to prevent the illegal copy completely. For instance, even if only a particular person can replay the music provided by the software, it is still possible to copy that music by recording that music itself using some recording device. Because of these limitations, the super-distribution system has not been widely accepted commercially.

FIG. 1 shows a conventional scheme for safely sending a credit card number on the network by utilizing the cryptographic technique.

In FIG. 1, the left side represents a store which is offering the software for sale and the right side represents a customer who is trying to purchase the software. These store and customer are connected by a computer network (which will be abbreviated hereafter as a network) such as a telephone line or Internet. Note here that functions on the store side and functions on the customer side are basically to be realized by means of softwares.

The store has a store secret key 101 and a store public key 102 according to the public key cryptosystem in advance. The store secret key 101 is stored in a store secret key storage unit 350, and its content cannot be referred from the others. The store public key is publicly disclosed so that anyone can acquire it through the network.

When the customer purchases the software, the customer first generates a shared key 103 at a shared key generation unit 302 in order to establish a sate communication with the store. This is done by generating a random number which cannot be guessed by the others. This shared key 103 is also referred to as a session key as it is shared during a particular session. The generated shared key 103 is then encrypted by a shared key encryption unit 312. The store public key 102 is utilized for this encryption.

The shared key encryption unit 312 gives this encrypted shared key 104 to a shared key transmission unit 314, and then the shared key transmission unit 314 transmits this encrytted shared key 104 to the store side through the network. At the store side, a shared key decryption unit 352 receives this encrypted shared key 104, and descrypts it using the store secret key 101 so as to obtain the shared key 103.

On the other hand, at the customer side, an information encryption unit 316 encrypts an information to be transmitted to the store side, by using the shared key 103. For instance this information encryption unit 316 is utilized in encrypting a credit card number to be transmitted to the store side. The encrypted information 107 obtained by the information encryption unit 316 is then transmitted to the store side through the network by an information transmission unit 318. At the store side, an information decryption unit 354 receives the encrypted information 107 and descrypts it by using the shared key 103 so as to obtain the information transmitted from the customer side.

According to this procedure, an information such as a credit card number can be transmitted safely through the network. Namely, the shared key 103 encrypted by using the store public key 102 can be decrypted only by the store who has the store secret key 101 according to the principle of the public key cryptosystein. Moreover, the transmitted information can only be descrypted by the store and the customer who shared the shared key 103 in this manner.

By the above described scheme, it is possible to sell the software only to a legitimate user who actually notified a necessary information such as a credit card number. However, the software can be copied easily in general, so that it is difficult to prevent an illegal act of copying the purchased software and distributing or selling the copied software.

There are many propositions for preventing such an illegal act, such as a scheme for making the software operable only upon an entry of a specific password or a scheme for making the software executable only upon an acquisition of a license from a specific server at a time of each execution, rather than selling the software as it is, but none of them has proven to be definitive. The reason is that it is still possible to make an illegal copy of the purchased software by copying not just the software itself alone but all surrounding portions of the customer side system (software) that are necessary in utilizing the software as well 80 as to reproduce the identical software utilization environment elsewhere, and therefore it is possible to commit this illegal act without any serious risk.

On the other hand, in a case of using a system which requires a complicated procedure such as an entry of a credit card number of a customer or a user ID or a password assigned to that customer in every occasion of the purchase, it is practically impossible to realize an elaborated charging scheme such as that for charging three yen for the tomorrow's weather forecast (as a low value service will be disused when a procedure is complicated). As a consequence, only expensive softwares could be distributed successfully and some software right owners could profit enormously while some other software right owners could not profit at all, so that the proper growth of the software distribution cannot be expected.

Even when a mechanism for storing a credit card number in a computer and automatically transmitting the stored credit card number is used in order to resolve this situation, for example, there is a possibility for the illegal use of that computer by a third person when that computer is stolen, so that the convenience and the safety cannot be achieved simultaneously.

As described, in the conventional software distribution system, it is possible to make a purchase order electronically without a danger of having a credit card number stolen, but a measure against the illegal copy of the purchased software has been insufficient. This is because a process of ordering the software and a process of utilizing the software have been separate processes from a customer's viewpoint, and it has been possible to apply various illegal methods for realizing the illegal copy to the software once the software was purchased.

In addition, in some conventional software distribution system. It has been difficult to establish an elaborated charging scheme such as that for charging the same customer repeatedly when this customer utilizes the same software at different computers, for example.

Nowadays, due to the rapid spread of the Internet, a system for electronically distributing information such as programs and charging for the distributed information is widely in use.

The major requirements in realizing the software distribution through a network such as the Internet include: (1) a mechanism for specifying a person who is trying to acquire the software and charging this person safely (a high security measure); (2) a protection of the copyright of the software in view of the fact that the software can be rather easily copied (a prevention of illegal copy); and a measure against a spread of the software containing virus.

Of these, (1) and (2) are already discussed above. As for (3), this is an indispensable requirement because the information such as programs is to be exchanged through the network.

In addition, it is also necessary to consider an effective utilization of communication resources by accounting for the communication line cost, etc., in view of the fact that a large amount of information is to be transmitted through the network.

From a point of view of the user's convenience, operations such as those for downloading programs through the network and installing them into a user's own terminal can be too difficult especially for those who are not accustomed to handle a personal computer. In order to realize a wide spread of such a system, it is expected to be required that even a person without much knowledge about the personal computer, the communication, etc. must be able to operate a system easily.

Moreover, in a case of selling the electronic information through the network, it is also necessary to provide a measure for handling a user's dissatisfaction with the purchased software product, because it is impossible to actually return the purchased software product itself even when a user is dissatisfied with the purposed software product.

Furthermore, it is desirable for such a system to be able to deal with the version updating of the software through the network easily, as it contributes to increase a user's reliability on a sales agent and a user's enthusiasm for purchasing the software product, thereby realizing a wide spread of a system.

Thus the conventional software distribution system has been associated with problems that not enough considerations have been given to the illegal copy of the software and the user's convenience.

SUMMARY OF THE INVENTION

It is therefore an object of the present invention to provide a software distribution system and a software utilization scheme in which an illegal copy of a software is difficult.

It is another object of the present invention to provide a software distribution system and a software utilization scheme in which a user can purchase a software through a network by means of a simple operation.

It is another object of the present invention to provide a software distribution system and a software utilization scheme for enabling a safe software distribution at proper prices.

It is another object of the present invention to provide a software distribution system in which the system operation can be done easily and the user's convenience can be improved by omitting required user operations for a purchase request and an install of a software offered through the network, and for a frequently required software version updating procedure.

It is another object of the present invention to provide a software distribution system in which the user's convenience can be improved by offering a free sample version (an active function part) of the software to be purchased first, and offering a passive function part for realizing functions of the regular software product at an appropriate price if the user is satisfied with the software product through a trial use of the free sample version.

It is another object of the present invention to provide a software distribution system in which a charged part (a passive function part) of the software is stored at the user's terminal in an encrypted form after being downloaded, and it is necessary to use an ID uniquely assigned to the user's terminal at a time of decrypting the encrypted software part, so as to be able to deal with the illegal copy of the software.

It is another object of the present invention to provide a software distribution system with a high security level, in which a charging processing is carried out at a time of offering a charged part (a passive function part) of the software to the user, according to a pre-registered user's charge information, so that there is no need to transmit a highly classified information on a credit card number at every occasion to purchase the software.

According to one aspect of the present invention there is provided a method for utilizing a software, comprising the steps of: storing a shared key shared between a software provider and a user, the shared key having a guaranteed correspondence with an ID information regarding a payment of a software fee by the user; requesting a desired software from the user to the software provider, and receiving the desired software in an encrypted form from the software provider; decrypting the desired software received from the software provider by using the shared key stored at the storing step; and utilizing the desired software in a decrypted form.

According to another aspect of the present invention there is provided a software distribution system in which a desired software is provided in an encrypted form from a software provider to a user, comprising: shared key storage units provided at both a software provider side and a user side, for storing a shared key shared between the software provider and the user, the shared key having a guaranteed correspondence with an ID information regarding a payment of a software fee by the user: a request transmission unit provided at the user side, for transmitting a request for the desired software to the software provider side: a software encryption unit provided at the software provider side, for encrypting the desired software by using the shared key stored in the shared key storage unit on the software provider side; an encrypted software transmission unit provided at the software provider side, for transmitting the desired software in an encrypted form to the user side; and a software decryption unit provided at the user side, for receiving the desired software in an encrypted form from the software provider, decrypting the desired software received from the software provider by using the shared key stored in the shared key storage unit on the user side, so as to obtain the desired software in a decrypted form that can be utilized at the user side.

According to another aspect of the present invention there is provided a software distribution system in which a desired software is provided from a software provider to a user through a network, comprising: a client terminal on a user side, which is connected with a server on a software provider side through the network, and including: a registration unit for registering a user charging information and a shared key shared between the software provider and the user into the server; a request unit for sending a request for a desired software to the server; and an install unit for installing each software downloaded from the server in response to the request sent by the request unit; and a server on the software provider side, including: a charging processing unit for carrying out a charging processing according to the user charging information registered by the registration unit, when the desired software requested by the request is a fee charged software; and a download unit for downloading a software in response to the request sent by the request unit, the software to be downloaded being encrypted by using the shared key registered by the registration unit when the software to be downloaded is required to be encrypted.

Other features and advantages of the present invention will become apparent from the following description taken in conjunction with the accompanying drawings.

BRIEF DESCRIPTION OF THE DRAWINGS

FIG. 4 is a diagram showing an exemplary data structure in a user information storage unit of the software distribution system of FIG. 2.

FIG. 9 is a diagram showing an exemplary data structure in a personal information file storage unit of the software distribution system of FIG. 6.

FIG. 13 is a flow diagram for a processing procedure at a time of downloading a software in the software distribution system of FIG. 6.

FIG. 14 is a diagram showing an exemplary data configuration for an install list used in the second embodiment of the present invention.

FIG. 15 is a diagram showing an install command format used in the second embodiment of the present invention.

FIG. 16 is a diagram showing an exemplary install command in the install command format of FIG. 15.

DETAILED DESCRIPTION OF THE PREFERRED EMBODIMENTS

Figure 1:
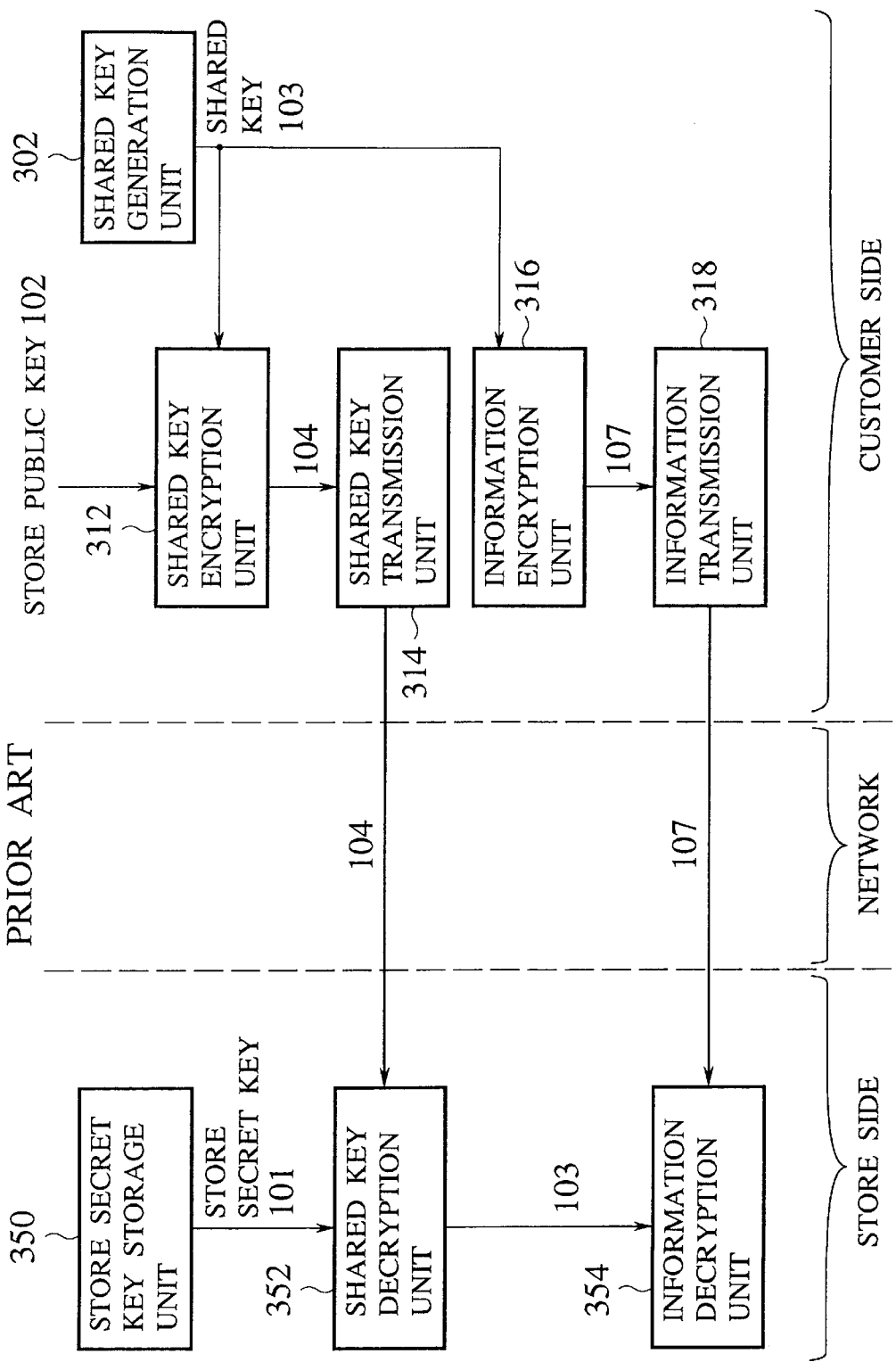
FIG. 1 is a diagram for explaining a conventional scheme for safely sending a credit card number on a network.

Now, several embodiments of a software utilization scheme and a software distribution system according to the present invention will be described in detail.

First, intended meanings of some terms used in the following description will be defined.

In the following, a software should be understood to cover everything that can be electronically transmitted without a physical distribution, including computer programs, databases, results obtained by the information retrieval service, books, musics, movies, TV programs, games, information to be interactively exchanged by the telephone or the interactive TV, etc.

Also, in the following, an ID information related to a software fee payment should be understood to include a credit card number, a valid period of a credit card, a private authentication number, a bank account number, a membership number related to a payment which is issued by a specific company (such as a user ID of a personal computer communication), etc.

Also, in the following, an auxiliary information related to a software utilization should be understood to mean an information on auxiliary conditions or software utilization environment at a time of a software utilization, which includes a number unique to a computer owned by a user (host ID), a product number of an OS in use, a password which is known only by a user, data registered in an IC card owned by a user, output data of an IC card owned by a user which is obtained upon entry of some input data, a time indicated by a built-in clock inside a computer, etc.

Referring now to FIG. 2 to FIG. 5, the first embodiment of a software utilization scheme and a software distribution system according to the present invention will be described in detail.

A mechanism for the software distribution is based on the cryptography technique, and the point is how to construct a safe system by utilizing the cryptography technique. Here, the data encryption algorithm itself can be the known one and there are many known algorithms, so that their detailed description will be omitted here.

For the purpose of data encryption, it is sufficient if a secret key necessary for the encryption is generated prior to the encryption and this secret key is shared by a user and a correspondent, but this cannot be assumed in a general case of software distribution, so that it is necessary to exchange the key first. To this end, the public key cryptosystem can be used.

In the public key cryptosystem, a store which sells softwares has two keys called a public key and a secret key. Data to be transferred is encrypted by using the public key at a transmitting side, and decrypted by using the secret key at a receiving side. The public key is literally a key to be disclosed in public, so that anyone can see the public key. A customer is requested to encrypt a shared key (not to be confused with the secret key) by using this public key, and send the encrypted shared key to the store. The store which has the secret key can decrypts the encrypted shared key by using the secret key, so as to obtain the shared key. In this scheme, even when communication data is wiretapped by a third person, this third person cannot decrypt the communication data because this third person does not know the secret key.

The well known example of the public key crypstosystem is the RSA scheme. There are also some protocols combining various cryptography techniques such as STT (Secure Transaction Technology) and SEPP (Secure Electronic Payment Protocol) for the electronic payment in which information on a credit card number can be transferred to the credit card company without disclosing the credit card number even to the store. These protocols are devised in consideration to the security among three parties: a customer, a store, and a credit card company. In contrast, the present invention is directed to an improvement of exchanges between a customer and a store in particular. In this first embodiment, this latter aspect of the present invention will be described in detail, but it is also possible to apply the present invention to exchanges among three parties, by combining appropriate techniques.

Figure 2:
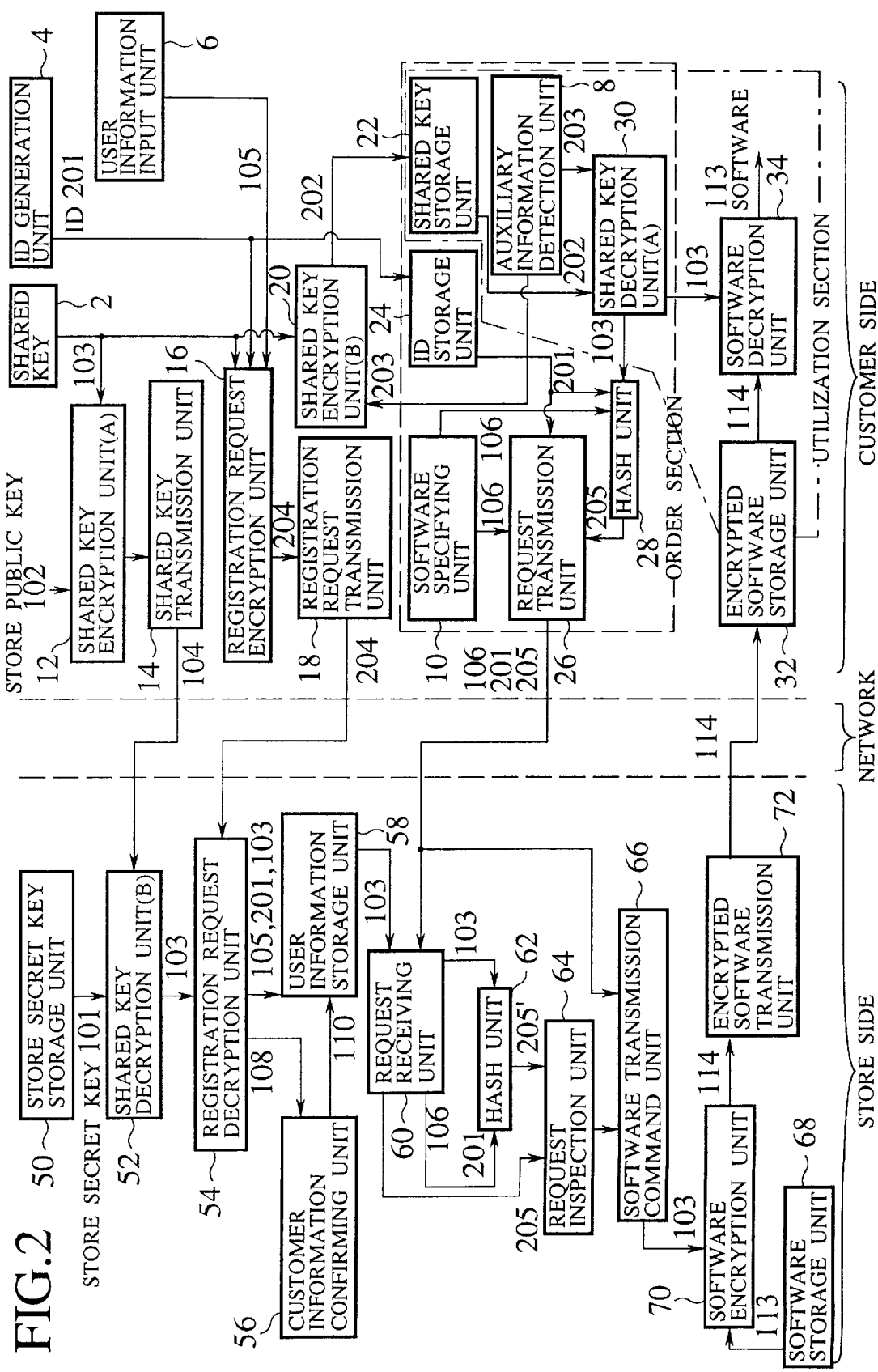
FIG. 2 is a block diagram of a software distribution system according to the first embodiment of the present invention.

FIG. 2 shows a typical configuration of a software distribution system in this first embodiment. In FIG. 2, the left side represents a store which sells a software, while the right side represents a customer who purchases the software, and the store and the customer are connected through a network.

Here, the charging is to be made by specifying a person who is trying to acquire that software, and charging this person by using this person's bank account, this person's credit card account, or electronic money. The system must be so constructed that various illegal acts can be prevented at this point. For example, it is necessary to prevent an illegal deceiving of the fee, an illegal means for acquiring the software, an illegal use of the other person's account to acquire the software illegally, an illegal act of making some other person purchases the software against that other person's will, an illegal act of claiming later on that the software was not purchased despite of the fact that software was indeed purchased, an illegal act of acquiring the other person's account number by wiretapping data transmitted through the computer network, etc.

The prevention of illegal copy is also an important issue. Even when a perfect charging mechanism is devised, the software can be copied rather easily in general, so that it is easily possible to distribute the purchased software to the others for free, or illegally resell the purchased software at cheaper price. In particular, in the today's well developed computer network, it is possible to carry out such illegal acts completely secretly by using information exchange means such as an encrypted electronic mail or message board, so that this is a very important issue today.

As shown in FIG. 2. the store has a store secret key 101 and a store public key 102 according to the public key cryptosystem. The store secret key 101 is stored in a store secret key storage unit 50, and its content cannot be referred from the others. The store public key 102 is publicly disclosed so that anyone can acquire it through the network. As a mechanism for acquiring the public key, a conventional scheme using a key distribution center is known, so that its description will be omitted here.

In this first embodiment, the overall operation is divided into three stages of a user registeration section, an order section, and a utilization section. The user registration section is an operation for showing that a customer has a credibility such as a credit card solvency. The order section is an operation for actually making an order. The utilization section is an operation for utilizing the purchased software. Here, it is assume that a customer who has done the user registration once can make the order without the user registration from the next time.

Note here that it is possible to modify these operations of this first embodiment in such a trivial manner that the user registration section and the order section are carried out together and called an order section, for example. In the following, these three stages of the operation in this first embodiment will be described for the most general case.

When a customer wishes to purchase the software, a shared key 103 is generated by a shared key generation unit 2 on the customer side in order to establish a safe communication with the store. This is done by generating a random number that cannot be guessed by the others. In the conventional software distribution system, the shared key was used only at a time of the order and the purchase, and discarded after the use without storing it in anywhere. In contrast, in this first embodiment, the shared key 103 is encrypted at a shared key encryption unit (B) 20 on the customer side, and a resulting encrypted shared key 202 is stored in a shared key storage unit 22 on the customer side.

At the shared key encryption unit (B) 20, an auxiliary information 203 obtained by an auxiliary information detection unit 8 on the customer side is used as an encryption key at a time of eneryption.

By using the auxiliary information 203 for the encryption of the shared key 103 at the shared key encryption unit (B) 20, the lowering of the safety due to the stealing of the shared key storage unit 22 can be prevented.

In addition, by selecting which auxiliary information is to be used, it becomes possible to realize the charging in a variety of different manners. For example, the charging can be made such that the software can be used continuously as long as the same machine is used, or the charging can be made such that the software cannot be used even on the same machine when a new OS is used, unless the fee is paid again. Also, the charging can be made such that there is a need to pay another fee when a certain time (date) is reached, or the charging can be made such that the software can be used for free during the night time but the software use during the day time is limited.

Moreover, it is also possible to use the password entered by the user at that point as the auxiliary information. In such a case by modifying the setting of the auxiliary information detection unit 8, it is easily possible to limit the software utilization to only a person who knows the specific password.

Note that there is an option of not providing the shared key encryption unit (B) 20 and the auxiliary information detection unit 8. In such a case, the shared key 103 generated by the shared key generation unit 2 will be directly stored into the shared key storage unit 22.

Now, the shared key 103 generated in this manner is also encrypted by a shared key encryption unit (A) 12 on the customer side. At a time of this encryption, the store public key 102 is utilized. The shared key encryption unit (A) 12 sends a resulting encrypted shared key 104 to a shared key transmission unit 14, and the shared key transmission unit 14 transmits this encrypted shared key 104 to the store side through the network. A shared key decryption unit (B) 52 on the store side then then decrypts this shared key 104 by using the store secret key 101, so as to obtain the shared key 103.

Also, an ID generation unit 4 on the customer side generates an ID 201 for the store to distinguish this customer from the other customers. This ID 201 can be basically an arbitrary random number, but the subsequent processing can be complicated if the ID 201 overlaps with the ID created by the other customer, so that the ID 201 should be created by a manner for avioding the overlap as much as possible. For example, the ID 201 can be given as a combination of a creation time and an ID of a computer owned by the customer. The ID 201 is sent to a registration request encryption unit 16 whle being stored into an ID storage unit 24 at the same time. Here, the storing of the ID 201 may be made by encrypting the ID 201 and then storing the encrypted ID, by using the similar procedure as in a case of storing the shared key 103, but it is assumed that the ID 201 is to be stored without encryption in the following.

On the other hand, the customer carries out a user information input at a user information input unit 6. Here, the user information includes a crediting information, an address, a name, an age, a name of the software desired to be purchased (in a case of making an order at the same time as the registration), etc.

Here, the crediting information is an information for showing that this customer certainly has an ability to pay, and that this customer can be responsible for the order. For example, the crediting information can be a credit card number, a valid period of a credit card, a private authentication number, etc. Also, depending on a manner of payment, the crediting information can be a bank account number, a membership number related to a payment which is issued by a specific company (such as a user ID of a personal computer communication), etc. In the following, the credit card number is used as a representative example of such a crediting information for the sake of simplicity.

Now, a user information 105 so entered is sent to the registration request encryption unit 16. This registration request encryption unit 16 encrypts the received ID 201 and user information 105 by using the shared key 103 to obtain an encrypted registration request 204. The encrypted registration request 204 is then transmitted by a registration request transmission unit 18 to a registration request decryption unit 54 on the store side through the network.

The registration request decryption unit 54 decrypts the encrypted registration request 204 by using the shared key 103, so as to obtain the user information 105 and the ID 201. After it is confirmed that this ID 201 is not overlapping with any ID used for the other customer in the past, this ID 201 is accepted as the formal ID. If this ID 201 is overlapping, the above described procedure is repeated from the beginning once again. Here, a method for confirming the ID and repeating the procedure is already known in the art and simple so that its description will be omitted.

Then, the registration request decryption unit 54 sends a customer information 108 to a customer information confirming unit 56. Here, the customer information is a part of the decrypted user information 105 which is related to the payment. For example, the customer information 108 can be a credit card number and a name. Also, the customer information confirming unit 56 confirms the credibility of the customer by inquirying (a system of) a customer credit investigation organization for credit cards, for example.

Figure 3:
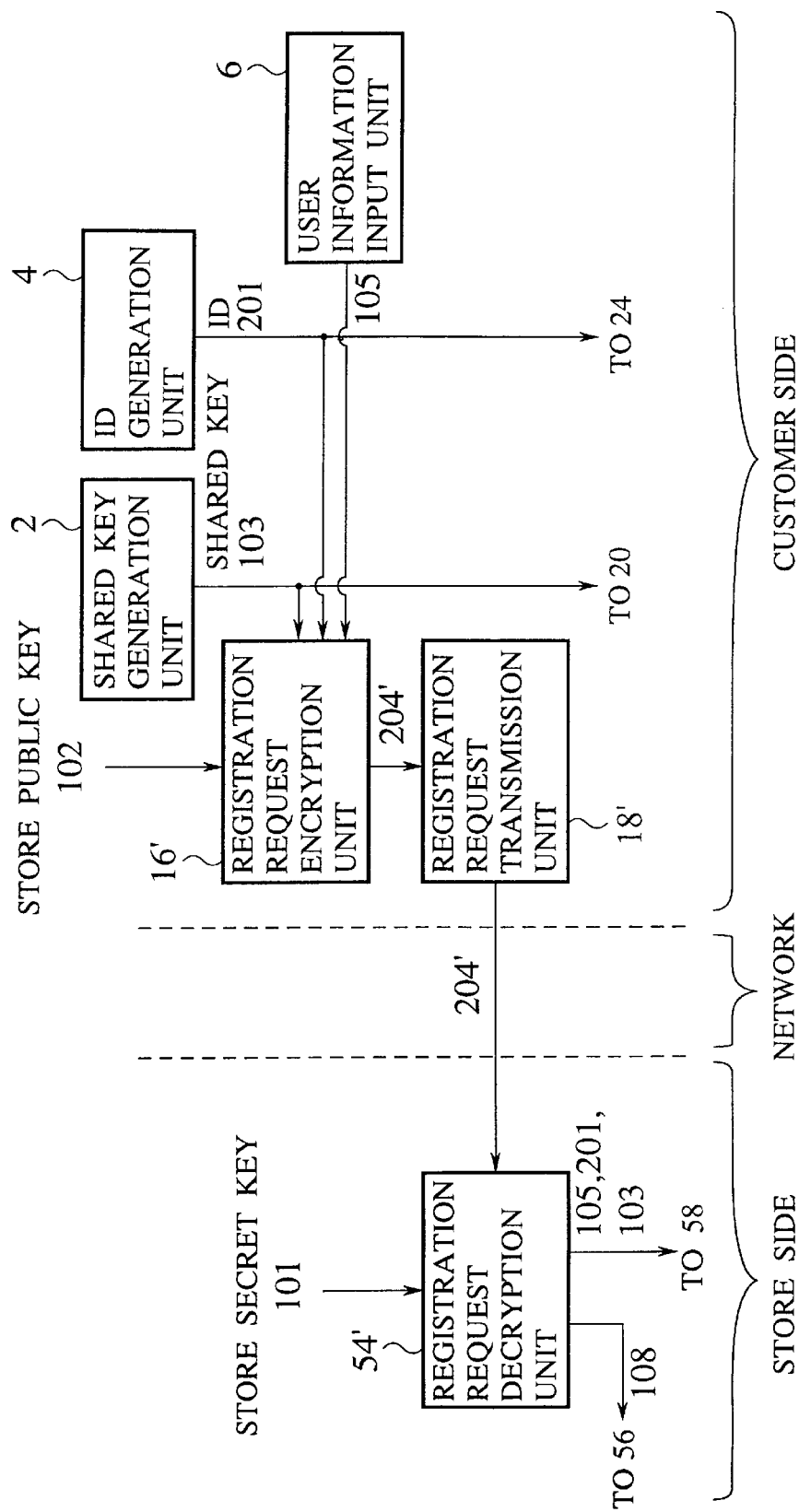
FIG. 3 is a block diagram of a partial configuration of the software distribution system of FIG. 2 in a modified case of the first embodiment of the present invention.

Note that, in the description up to this point, the communication from the customer to the store is carried out by encrypting the ID 201 and the user information 105 by using the share d key 103, but this part of the above description can be modified. For example, FIG. 3 shows a partial configuration which differs from the corresponding one in FIG. 2, in an exemplary modified case of sending all of the ID 201, the user information 105 and the shared key 103 by encrypting them using the store public key 102. In this case, the shared key 103 generated by the shared key generation unit 2) the ID 201 generated by the ID generation unit 4, and the user information 105 obtained by the user information input unit a are all sent to the registration request encryption unit 16'. Then, the registration request encryption unit 16' encryptes them by using the store public key 103, and sends the resulting encryption registration request 204' to the registration request transmission unit 18'. The encrypted registration request 204' transmitted by the registration request transmission unit 18' is received by the registration request decryption unit 54' and decrypted by using the store secret key 101 so as to obtain the user information 105. the ID 201 and the shared key 103. The rest of the operation in this case of FIG. 3 is identical to the operation in a case of FIG. 2.

Now, on the store side, a user information storage unit 58 stores in correspondence the user information 105, the ID 201 and the shared key 103 obtained from the registration request decryption unit 54. when this customer is a good user to whom the software can be sold prom now on according to a credit information 110 confirmed by the customer information confirming unit 56.

FIG. 4 shows an exemplary data structure to be stored in the user information storage unit 58. In FIG. 4, the information of each customer is managed in the registration order. Here, there is no need to manage the information in the registration order, but in a case of attaching a time information to the ID generated by the ID generation unit 4 for the purpose of avoiding the overlap of IDs, the ID overlap check can be carried out for only IDs of those customers who are registered rather recently.

As shown in FIG. 4, for each customer, the user information storage unit 58 records an ID, a shared key, a credit card number, and a private information. Here, the ID is a number uniquely assigned to that customer, which is used at a time of extracting the shared key or the credit card number of that customer. The shared key has the same function as already explained.

The credit card number is a number used in the payment by that customer. This credit card number may contain the valid period of the credit card within itself. In a case of using the payment from the bank account, a bank account number or a user specific number for specifying a bank account number will be entered instead.

Also, the credit card number is data to be sent by the store to the credit card company in order to specify the customer name, so that it is not absolutely necessary to register the card number itself. For example, a customer number issued by the credit card company for the purpose of notifying the customer name to the store may be stored instead. In such a case, there is no need for the store to manage the customer's credit card number, so that the safety against the stealing of the user information storage unit 58 can be increased. In this regard, the improvement can be realized by a method the conventionally known in the electronic payment protocol, so that its description will be omitted.

The private information is an auxiliary information related to that customer, which may not necessarily be significant for the payment purpose. However, the private information recorded here way be utilized as a reference data for the purpose of the credit investigation for that customer.

In FIG. 4, for the fourth customer in the registration order, the information in fields other than the ID is erased. This implies that the sales with respect to this customer had been stopped for some reason. The reason for keeping the ID even after the sales had been stopped is because the subsequent processing would be complicated it an order is made by that customer after the same ID is newly registered for another customer. Here, however, this customer actually cannot make an order illegally because the shared key does not match, so that an entire entry for this customer may be erased after a certain period of time.

Also, in FIG. 4, for the fifth custmer in the registration order, the information in the credit card number field alone is erased. This implies that a valid period of a credit card of this customer has expired. In this case, however, the shared key is still valid, so that it implies that the store still acknowledges the legitimacy of this customer. By registering a new credit card number, it becomes possible for this customer to make an order again. Thereafter, the software sales with respect to the customers are carried out according to the user information 105 and the ID 201 stored in this user information storage unit 58.

Note that, in FIG. 4, each data is depicted in a non-encrypted form for the sake of simplicity, but it is preferable to store each data in an encrypted form in the actual system for the sake of security against the stealing. For example, the encrypted shared key can be stored instead of storing the shared key. This can be readily realized by the conventionally known technique so that its description will be omitted.

This completes the description of the user registration section in this first embodiment.

Next, the order section for actually making an order in this first embodiment will be described.

At the customer side, the customer enters a product specifying data 106 such as a name of the software desired to be purchased at a software specifying unit 10. The product specifying data 108 is then sent to a hash unit 28 and a request transmission unit 26, while the ID 201 extracted from the ID storage unit 24 is also sent to the hash unit 28 and the request transmission unit 26. On the other hand, a shared key decryption unit (A) 30 decrypts the encrypted shared key 202 taken from the shared key storage unit 22 by using the auxiliary information 203 detected by the auxiliary information detection unit 8, so as to obtain the shared key 103.

The hash unit 28 hashes the product specifying data 103 and the ID 201 by using the shared key 103, and sends the obtained hash value 205 to the request transmission unit 26. Here, the hashing is an operation to obtain a certain value (hash value) by applying a specific function (which is shared at the store side) with respect to an input data, where this function has a property that the output cannot be guessed from the input and is usually referred to as a hash function. A method for producing the hash function is conventionally known so that its description will be omitted.

The request transmission unit 26 transmits the product specifying data 108, the ID 201 and the hash value 205 to the store side. A request receiving unit 60 at the store side then receives these data, and reads out the shared key 103 of the customer who has the corresponding ID from the user information storage unit 58. When the corresponding ID cannot be found, it is regarded as an error and an order will not be accepted.

A hash unit 62 on the store side hashes the product specifying data 108 and the ID 201 by using the shared key 103 so as to obtain a server hash value 205' and sends this server hash value 205' to a request inspection unit 64. The request inspection unit 64 then compares this server hash value 205' with the hash value 205 received from the request receiving unit 60. The function of the hash unit 62 is identical to the hash unit 28 on the customer side, so that the has value 205 and the server hash value 205' should coincide. If they do not coincide, it implies that either it is an order from a user who does not have the correct shared key or it is an improper order such as that in which a name of the product ordered by the other person has been altered. Note that, as will be described below, even if the software is sold without this check, a person who does not have the shared key cannot utilize this software anyway, but this check is still necessary because there can be a person who makes an improper order using the other person's name for the purpose of harassing that other person.

When the hash value 205 and the server hash value 205' coincide, the request inspection unit 64 notifies this fact to a software transmission command unit 66. At this point, an occurrence of the purchase request (order) from the customer is legitimately proved, and the payment can be made. As for a specific manner of the payment, it suffices to use a method known in the conventional electronic payment, so that it description will be omitted.

Note that, strictly speaking, there can be a case in which the request transmission method described here is insufficient. For example, by wiretapping the communication and repeatedly transmitting the same request to the store, a person who does not have the shared key can make an improper order. This is an illegal act usually known as a replay attack, and it is known that this replay attack can be avoided by attaching an order time information or a serial number issued by the store to the request. Such cryptographic techniques can be employed in the present invention, but they are conventionally known so that their description will be omitted.

The software transmission command unit 66 sends the shared key 103 to a software encryption unit 70, and commands the transmission of the encrypted software to an encrypted software transmission unit 72. The software encryption unit 70 encrypts a corresponding software 113 read out from a software storage unit 88 by using the shared key 103 to obtain an encrypted software 114, and the encrypted software transmission unit 72 transmits the encrypted software 114 to the customer side.

Here, the encryption of the software is used for the purpose of casting the software into a form which cannot be directly executed or referred, so that there is no need to carry out the usual data encryption. For example, a computer program which has a mechanism of being not executable unless the password is entered can be considered as a kind of the encrypted software. In the following description, the encrypted software is essumed to have this broad meaning unless otherwise stated. The encrypted software 114 transmitted from the store side is then stored into an encrypted software storage unit 32 at the customer side.

This completes the description of the order section in this first embodiment.

Next, the utilization section for actually utilizing the software in this first embodiment will be described.

First, the shared key decryption unit (A) 30 on the customer side decrypts the encrypted shared key 202 taken out from the shared key storage unit 22 by using the auxiliary information 203 detected by the auxiliary information detection unit 8 so as to obtain the shared key 103. The operation up to this point is based on the same mechanism as that for taking out the shared key at a time of making an order. A software decryption unit 34 then decrypts the encrypted software 114 taken out from the encrypted software storage unit 32 by using the shared key 103 so as to obtain the software 113.

By the above described procedure, it is possible to sell the software only to the legitimate user who actually notified necessary information such as a credit card number. In addition, the shared key 103 is stored in an encrypted form obtained by using the auxiliary information 203, so that even when all of the shared key decryption unit (A) 30, the shared key storage unit 22 and the encrypted software storage unit 32 are copied, it is impossible to make an illegal copy of the software. Moreover, it is also difficult to make an illegal copy of the software by analyzing the operation mechanism of the software, so that it actually becomes pointless to make an illegal copy by spending much effort and time.

Furthermore, unlike the conventional software distribution system in which no damage is incurred to a person who distributes illegal copies so that there was no effective way of preventing this illegal act, according to the software distribution system of this first embodiment, the shared key 103 on which the encryption is based is a key for use in the execution of the software as well as a key for use in the purchase of the software, so that if a malicious user distributes illegal copies with his shared key set therein to the others, the others could then purchase new softwares by using that malicious user's credit card number so that there is a possibility of incurring an actual damage to a malicious user himself, and for this reason it is quite effective in preventing this type of illegal act.

Also, the software distribution system of this first embodiment adopts a scheme in which a user who has completed the user registration once can subsequently purchase softwares without being required to enter the credit card number as long as a user uses tile same computer used for the user registration, which is convenient for a user, and yet at the same time, the charging can be made quite safely. In addition in the software distribution system of this first embodiment, there is no need for a customer to have a uniquely assigned public key. In other words, the sales can be realized under a relatively loose condition that a customer is assumed to have his own credit card number.

Figure 5:
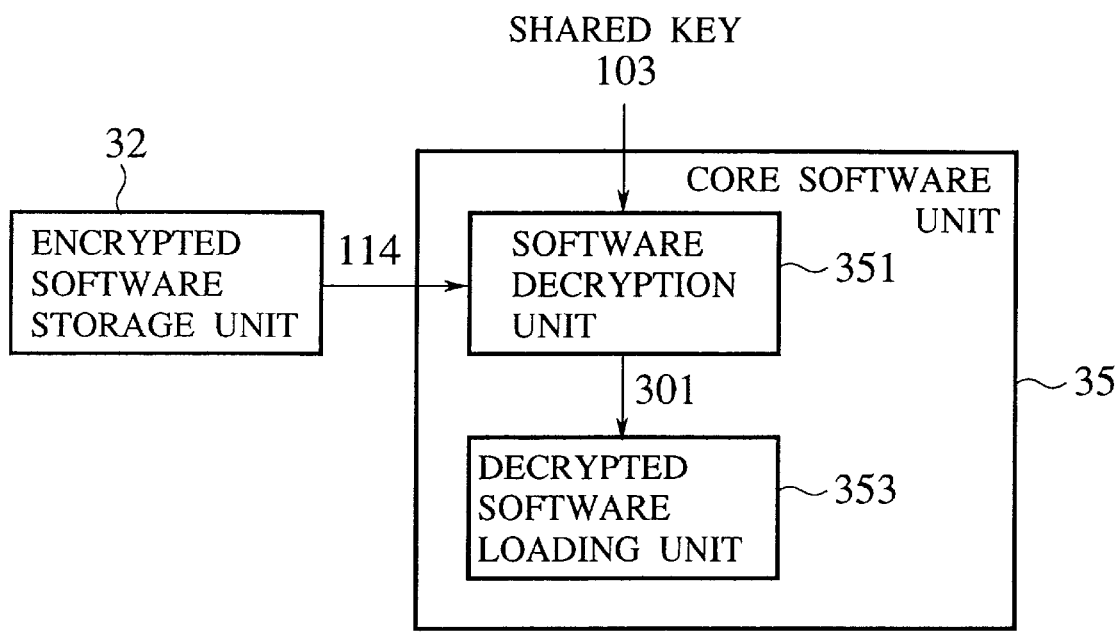
FIG. 5 is a block diagram of a partial configuration of the software distribution system of FIG. 2 in an application case of the first embodiment of the present invention.

Also, as an application of the first embodiment, it is possible to apply this software utilization scheme only to a part of the software, rather than the software in its entirety. For example, FIG. 5 shows a partial configuration for realizing such an application case of the first embodiment, where a core software unit 35 of FIG. 5 is a program corresponding to the software decryption unit 34 of FIG. 2.

This core software unit 35 is the main portion of the computer program which cannot be operated completely in this form. Further functions can be added to this main portion by adding the encrypted software to this core software unit 35, in other words, even when the encrypted software is executed by a person who has no right to decrypt this encrypted software, not all the functions of the software can be realized.

When the core software unit 35 is executed, a software decryption unit 351 checks whether the encrypted software corresponding to this core software unit 35 exists in the encrypted software storage unit 32 or not. If it exits, the corresponding encrypted software 114 is read out from the encrypted software storage unit 32, decrypted by using the shared key 109, and a resulting decrypted software 301 is stored into a decrypted software loading unit 353. If the shared key 103 cannot be obtained, correct data cannot be stored into the decrypted software loading unit 353.

The core software unit 35 verifies that the decrypted software 301 stored in the decrypted software loading unit 353 is the correct data. Here, a method for realizing this verification can be a method for checking whether the decrypted software 301 stored in the decrypted software loading unit 353 is identical to data anticipated by the core software or not (i.e., whether it is correctly decrypted or not), or a method for executing the decrypted software 301 stored in the decrypted software loading unit 353 itself as a program, for example.

The advantages of this application case of the first embodiment are as follows.

First, it is possible to set the core software portion as a limited function version of the software and only a charged portion of the software can be sold as the encrypted software. For example, the core software can be a word-processor without a printing function and a communication function, and the printing function and the communication function are to be sold as separate charged softwares. Using this scheme, the core software can be distributed for free through a freely accessible medium such as a CD-ROM or an electronic message board from which the core software can be acquired by anyone, and the charged portion can be purchased only when a user is satisfied with a trial use of the core software.

In the conventional mail order sales, there is a system for protecting a customer called a cooling off period during which a customer can return the purchased product for free of charge because the product cannot be checked in advance, but in a case of dealing with the software which is in an intangible form, it is impossible to return the once purchased software. In this regard, it is possible to protect the customer by offering the core software shown in FIG. 5 as a sample version for trial use by the consumer, without a need for any cooling off period. After the actual trial use, the customer can purchase the other charged functions only when the customer is satisfied with the trial use. In addition, instead of providing one free portion and one charged portion, it is possible to offer more than one additional functions, so that the customer can purchase only the desired additional functions at appropriate price. In this manner, it is also possible to prevent an unfair trade practice to require the customer to purchase everything including those functions which are actually unnecessary for that customer.

Also, an amount of data involved in the encryption and decryption can be reduced in this application case. In general, the calculation for the encryption or decryption takes a time in proportion to an amount of data involved, so that if a software in a very large size is sold by encrypting it one by one at a time of purchase, it would require a considerable amount of time for the purchase (downloading) and/or the execution (decryption). For this reason, a portion to be encrypted should be kept as small as possible.

This requirement can be satisfied automatically by simply dividing a portion to be encrypted and a portion not to be encrypted if an amount of data for the charged additional function portion is very small. However, when the charged additional function portion is large or when the entire software is a charged one to be encrypted, the mechanism shown in FIG. 5 can be utilized by setting the core software such that the charged portion cannot function unless the encrypted software is decrypted even if the encrypted software itself is stored in the core software unit.

Also, the reduction of an amount of data implies that the communication line can be a thin one. In other words, the downloading takes time in general when a communication line between the store and the customer for purchasing the charged information is slow, but if the core software portion was already distributed by a CD-ROM or acquired through the other high speed network, it suffices to acquire a small encrypted software portion alone, so that the purchase does not take much time.

Moreover, this application case can also be utilized as another method for preventing the illegal copy. For example, when the software to be sold is in a form of a book, the software will be eventually converted into the character string data in a computer readable format on a memory, so that it is possible to steal such converted data from a memory rather easily. In such a case, the core software can be set as a software for reading the book, which reads the individual software (book) offered as a charged additional function and displays a content of the individual software on a screen. Then, by adopting a mechanism in which the core software decrypts and displays the necessary data (encrypted data) whenever a need arises, it becomes quite difficult to read out all the book data (characters) together.

In addition, the decrypted software is going to be present on a memory only while the core software is executed, so that when a procedure for the core software to utilize the encrypted software is made very tedious, it is possible to improve the safety because it would require a considerable amount of effort and time to break the encryption of the software. In general, a software to be sold through a network is often a software which requires rather frequent version updating or an information with only a temporal value (such as a weather forecast information), so that when the safety level of the software la made very high, it becomes much more economical to purchase the software legitimately by paying the proper price rather than spending much effort and time to produce illegal copies of the software. Consequently, when the safety level is made very high, it becomes pointless to commit the illegal act, and the fair distribution of the software will be promoted.

Note that, in the above description, it is assumed that the software is to be sold at some price, but the application of the present invention is not limited to such a case of selling the software at some price. For example, in a case of distributing a software whose export to a certain country is prohibited, the software distribution system of this first embodiment can be utilized in distributing such a software to specific customers alone according to the user information.

It should also be obvious that a mechanism for charging a utilization fee for each occasion to utilize the software can be readily realized by a simple modification of the first embodiment described above to add the function of the order section to the core software unit of FIG. 5.

It is also possible to realize the software distribution system of this first embodiment in a form of a software itself, by implementing the required procedures in forms of programs on a computer.

Now, the major effects obtained by the software distribution system of this first embodiment will be summarized.

In this first embodiment, at a time of purchasing the software, the software can be purchased in a manner convenient to the customer in which there is no need to spend effort and time in entering the credit card number, while the charting can be realized safely. Also, what is to be charged can be specified in a sophisticated manner, so that the sales at a price appropriate for a value of each software will be promoted.

The consumer can create the shared key for enabling the purchase at a desired store at his own will by using the general purpose credit card, so that there is no need to memorize the membership number issued by each store, and the software can be purchased while keeping the credit card itself in safety. In addition, even if the shared key is stolen, the use of the shared key is quite limited so that the damage is kept minimum. This shared key has a lower generality than the usual credit card so that the potential damage is very low even if it is stolen. Moreover, there is no need to pay any money in advance unlike a case of using a prepaid card, and the user can create or discard the shared key according to the need at his own will.

Moreover, the shared key is a key for use in the execution of the software as well as a key for use in the purchase of the software, so that it is both difficult as well as risky to make the illegal copy of the software, and consequently it becomes pointless to commit the illegal art so that the protection of the copyright owner's right can be realized easily.

Note that one of the purposes of the present invention is to enable the install of the software without a tedious procedure. However, when a mechanism for realizing an easy install is provided, it also becomes easier to rewrite data of the individual customer such as program files, and there is a possibility of creating a security hole in which a malicious person steals the communication and offers false programs to the customer from a faked store. However, according to the software distribution system of this first embodiment, the software is provided in an encrypted form obtained by using the shared key which are only known to the store and the customer, so that even if a malicious person successfully offers the false programs to the customer illegally, the customer can easily detect this illegal act because the malignant false program data cannot be correctly decrypted by using the shared key. Thus, a malignant computer program called a virus which causes some harmful effects will not be installed according to this first embodiment, so that the safety of the software distribution can be improved.

According to the software distribution system of this first embodiment, a shared key to be used when a software provider offers the encrypted software to a user is set in relation to the ID information related to the payment of the software fee, and a user who shares the shared key is not required to enter the ID information at every occasion of ordering the software, so that the software can be purchased through the network by a simple operation, while the software provider can realize the software distribution at a proper price safely. Moreover, the illegal copy of the software can actually incur damage to a malicious user, so that the illegal copy of the software can be prevented effectively.

Referring now to FIG. 6 to FIG. 17, the second embodiment of a software distribution system according to the present invention will be described in detail.

Figure 6:
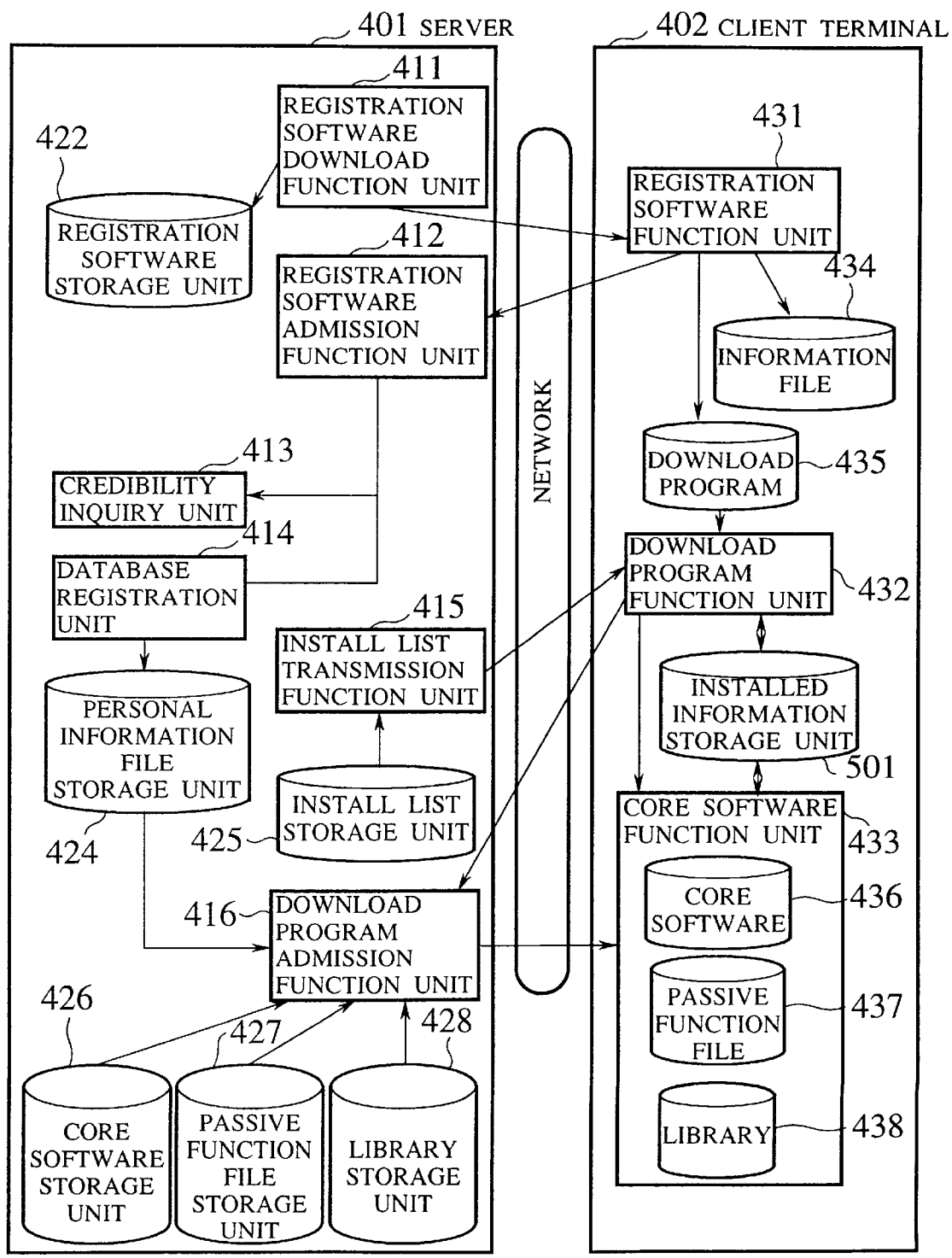
FIG. 6 is a block diagram of a software distribution system according to the second embodiment of the present invention.

FIG. 6 shows an overall configuration of a software distribution system in this second embodiment, which generally comprises a server 401 for selling softwares and a client terminal 402 for purchasing softwares, which are connected through a network such as the Internet.

The software distribution system of FIG. 6 is a system for electronically distributing softwares to a user safely and conveniently, and charging fees for the distributed softwares. Namely, a user makes an access to The server 401 through the network using a browser (not shown) of the client terminal 402, for example, and transmits a purchase request for a desired software. At the server 401, the requested software is downloaded into the client terminal 402 while charging the user at the same time. At the user side, it is possible to purchase and install a desired software by simply manipulating a mouse (not shown) of the own terminal (client terminal).

Now, a user who wishes to use the software distribution system of FIG. 6 first activates a registration software at the own client terminal 402 (a personal computer, for instance).

The registration software is a software for carrying out a prescribed system setting and a user registration to the server 401.

The registration software is stored in a registration software storage unit 422 of the server 401 in advance, and downloaded and immediately installed into the client terminal 402 through the network by a registration software download function unit 411.

A registration software function unit 431 of the client terminal 402 is a function unit which is set into an executable state at the client terminal 402 as the registration software downloaded from the server 401 is installed into the client terminal 402, and which executes functions of the registration software.

Note that the registration software may be distributed to the user in advance by means of a recording medium such as a CD-ROM.

When the registration software function unit 431 is activated the prescribed system setting is carried out first.

Next, the user registration to the server 401 is carried out. Namely, the registration software function unit 431 first generates a session key and a shared key for encryption and decryption of a high security level information (a credit card number, an authentication information, etc.) to be transmitted between the server 401 and the client terminal 402, applies a prescribed encryption processing to the generated shared key, and stores the encrypted shared key in an information file 434.

In addition, according to a procedure displayed at the client terminal 402, the user enters a personal information such as a name, an address, a credit card number, a valid period of a credit card, an age, a date of birth, etc., and this personal information is encrypted by using an encryption key which is predetermined between the server 401 and the client terminal 402 and transmitted to the server 401 through the network.

At a registration software admission function unit 412 of the server 401, when the encrypted personal information and the key data are received, a decryption using a prescribed decryption key is carried out and a credibility inquiry with respect to a credit card company is carried out through a credibility inquiry unit 413. When the credibility is confirmed, the personal information and the key data are registered into a personal information file storage unit 424 through a database registration unit 414. (If the personal information and the key data are already written, they are updated to new data while a back-up of old data is made.)

When the user registration is finished normally and a notice about this fact is received, the client terminal 402 installs a program to be activated at a time of software purchase by the user, that in, a download program 435. Namely, the download program 435 is already downloaded along with the registration software, and this download program 435 is outputted from the registration software function unit 431 and installed into the client terminal 402.

A download program function unit 432 of the client terminal 402 is a function unit which is set into an executable state at the client terminal 402 as the download program downloaded from the server 401 is installed into the client terminal 402, and which executes functions of the download program.

When the registration software function unit 431 installs the download program, a setting for automatically activating the download program is made. This setting is made, for example, by registering a command for activating the download program when a prescribed identification information (which is assumed to be "Content-type: Application/ABC" in this second embodiment) is detected from a header portion of data received at the client terminal 402 into a prescribed file.

This completes the user registration using functions provided in the registration software.

Next, the operation of each function unit in the software distribution system at a time of downloading a desired software from the server 401 will be described.

First, the user activates the browser of the client terminal 402, for example, and makes an access to the server 401 by manipulating the mouse and requests a desired software to the server 401.

At an install list transmission function unit 415 of the server 401 which received this transmission request, an install list (a list describing which file should be installed how) corresponding to the software specified by the user is read out from an install list storage unit 425 and transmitted to the clients terminal 402.

When the install list is received, the client terminal 402 activates the download program function unit 432 and transmits a request (download request) selected according to the install list to the server 401.

At a download program admission function unit 416 of the server 401, a file is read out from one of a core software storage unit 426, a passive function file storage unit 427 and a library storage unit 428 according to the request from the client terminal 402, and when it is confirmed that this user is an already registered user by referring to the personal information stored in the personal information file storage unit 424, the read out file is transmitted to the client terminal 402. At this point, the data compression (and the data encryption if necessary) is carried out. Also, when the file requested from the client terminal 402 is a file to be charged, a prescribed charging processing is carried out by referring to the personal information stored in the personal information file storage unit 424.

The download program currently executed at the client terminal 402 then receives the file from the server 401, and if there is no error, this file is installed.

A core software function unit 433 of the client terminal 402 is a function unit which is set into an executable state at the client terminal 402 as the software downloaded from the server 401 is installed into the client terminal 402, and which realizes prescribed information processing functions. This core software function unit 433 is configured such that a pre-installed core software 436 becomes fully functional as a passive function file 37 is incorporated by the core software 436 at a time of its activation.

Note that a program to be downloaded can be a general program other than the core software and the passive function file, and such a general program will be downloaded from the server 401 as a library 438.

An installed information storage unit 501 of the client terminal 402 registers an information (file names and version information) regarding files constituting the core software 436 and the passive function file 437 which are downloaded from the server 401 and installed into the client terminal 402.

Note that, as will be described below, a software product is formed by an active function file and a passive function file, where the passive function file is encrypted and then downloaded from the server 401, and stored into the client terminal 402 in the encrypted form.

When the core software function unit 433 is activated, the installed information storage unit 501 is searched through to check whether the passive function file is already installed or not. When the related passive function file is already installed, this encrypted passive function file is decrypted, and the normal operation is executed by incorporating the decrypted passive function file.

Figure 7:
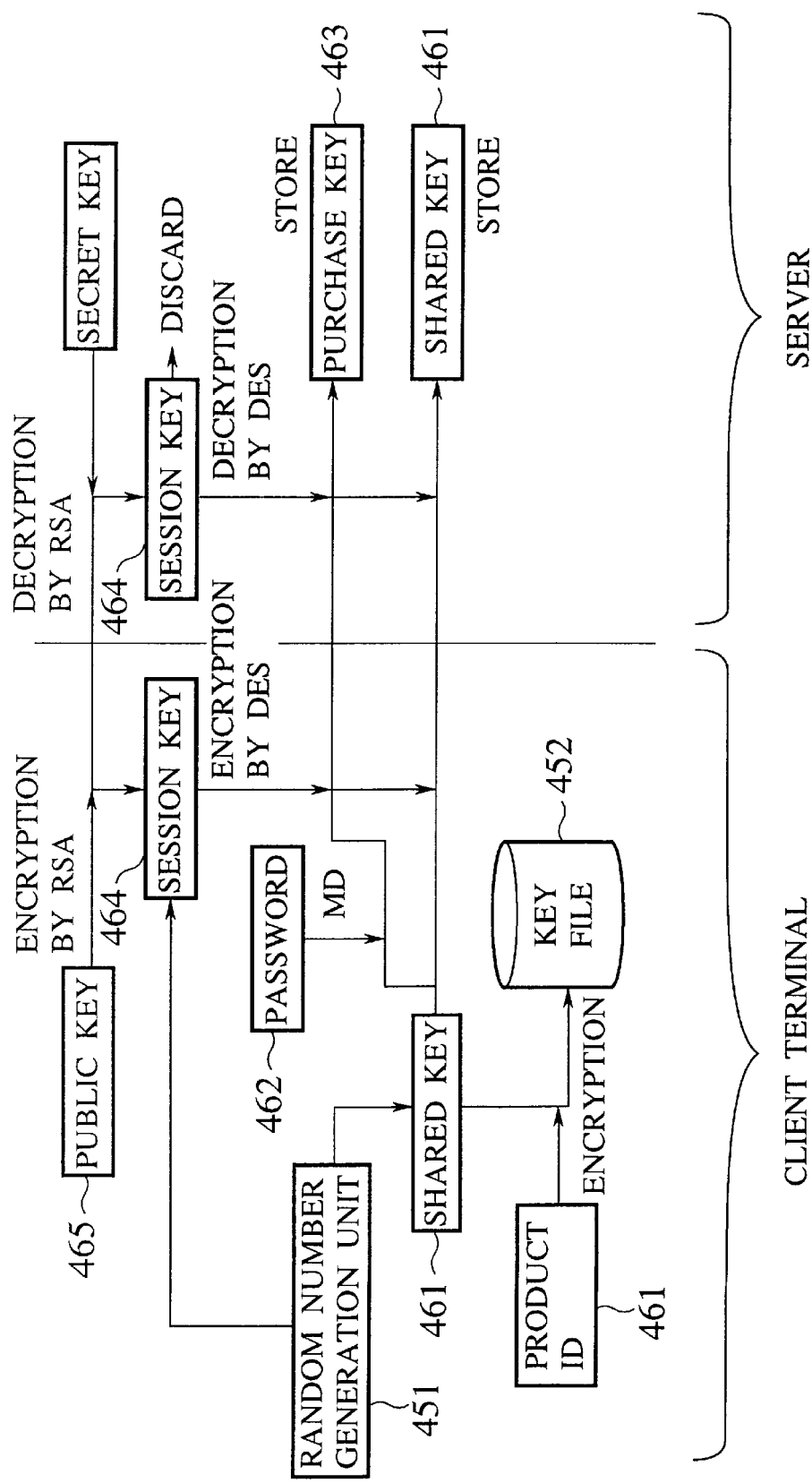
FIG. 7 is a data flow diagram showing an exemplary flow of key data used in the software distribution system of FIG. 6.
Figure 8:
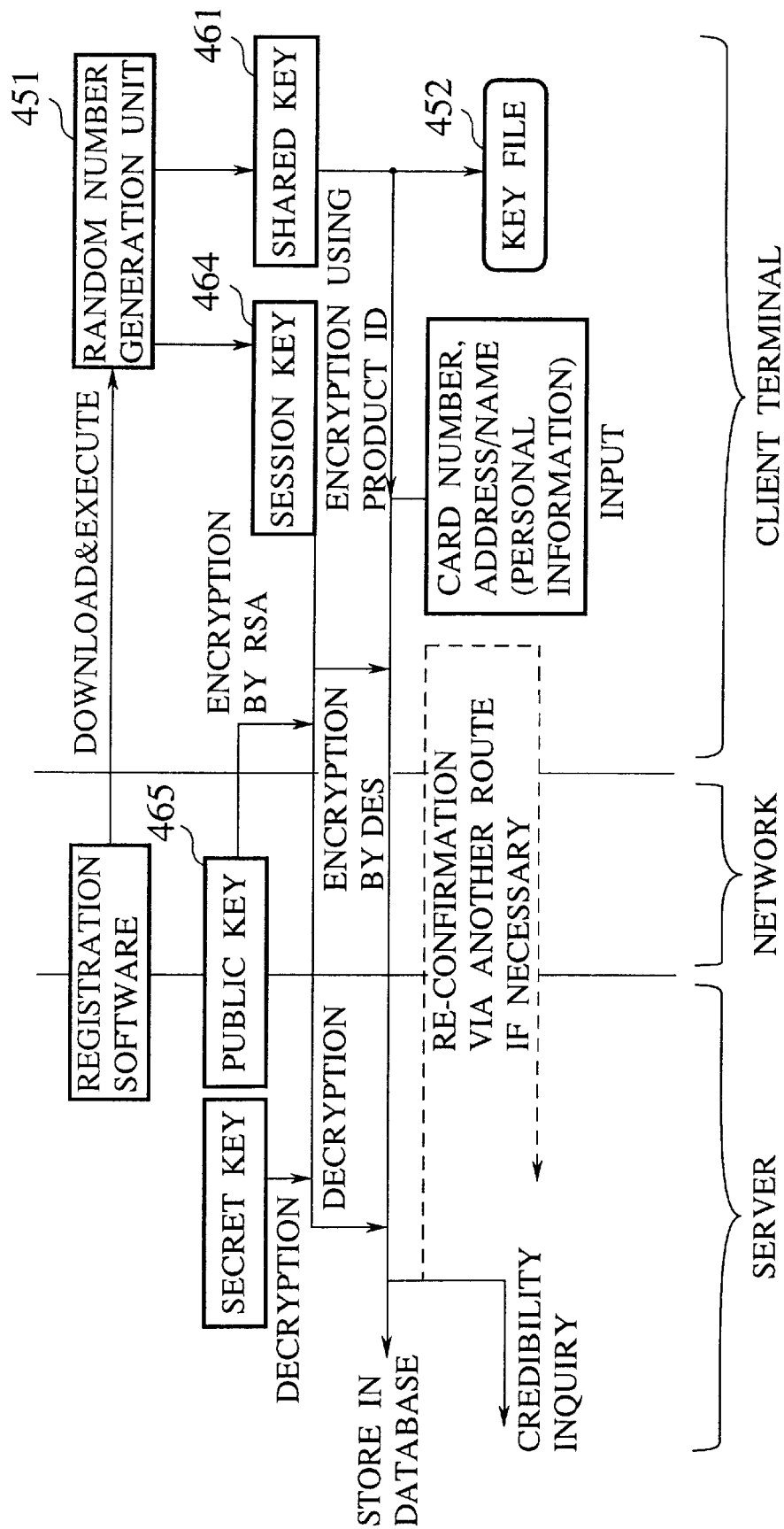
FIG. 8 is a data flow diagram showing an exemplary flow of data at a time of user registration in the software distribution system of FIG. 6.

Next, with reference to FIG. 7, an exemplary flow of the key data used in the software distribution system of FIG. 6 will be described. Here, an exemplary flow of data at a time of user registration as shown in FIG. 8 will also be referred whenever necessary.

A random number generation unit 451 provided in the registration software function unit 431 generates a random number as a shared key 461 to be shared between the server 401 and the client terminal 402.

This shared key 461 is a key to be used for preventing the illegal copy of the software. This shared key 461 is encrypted by the secret key cryptosystem such as DES (Data Encryption Standard) for example, using a product ID uniquely assigned to each client terminal 402 and then stored as a key file 452 in the information file 434 of the client terminal 402.

Also, when a setting of a password 462 at the client terminal 402 is possible, this password 462 is hashed by using the shared key 461 and the obtained output is used as a purchase key 463. Here, the purchase key 463 is a key to be used for the user authentication at a time of product (software) purchase. Here, if a password is not available, the shared key 461 itself can be directly used as the purchase key 463.

The random number generation unit 451 generates a session key 464 and a shared key 461 at the client terminal 402 at a time of the user registration.

The session key 464 is a key to be used at a time of encrypting the personal information and the key data (the shared key 461, the purchase key 463) by the secret key cryptosystem such as DES for example, at a time of the user registration. At this point, the session key 484 is also encrypted by the public key cryptosystem such as RSA (Rivest Shamir Adleman) using a public key 485 which is prescribed with respect to the software provider and included in the registration software, and then transmitted to the server 401.

The encrypted personal information, key data (the shared key 461, the purchase key 463) and session key 464 transmitted from the client terminal 402 are received at the server 401, the encrypted session key 464 is decrypted by the RSA first, and the encrypted personal information and key data are decrypted by the DES using the decrypted session key 464. The session key 464 is then discarded.

At the server 401, the decrypted personal information and key data are stored into the personal information file storage unit 424, while the credibility inquiry according to the personal information is carried out, as indicated in FIG. 8.

Note that, at a time of the credibility inquiry, a re-confirmation with respect to the client terminal 402 may also be made via another route, according to the need.

FIG. 9 shows an exemplary data structure of the personal information to be stored in the personal information file storage unit 424. As shown in FIG. 9, for each customer, the personal information file storage unit 424 records in correspondence the key data (the shared key, the purchase key) transmitted from the client terminal 402, and the personal information including a credit card number and a private information such as a name and an address. and this information for users are recorded in an order of user registration.

The information stored in the personal information file storage unit 424 will be referred in the user authentication, the credibility inquiry with respect to the credit card company, and the charging processing for the software when each registered user purchases the software product.

Figure 10:
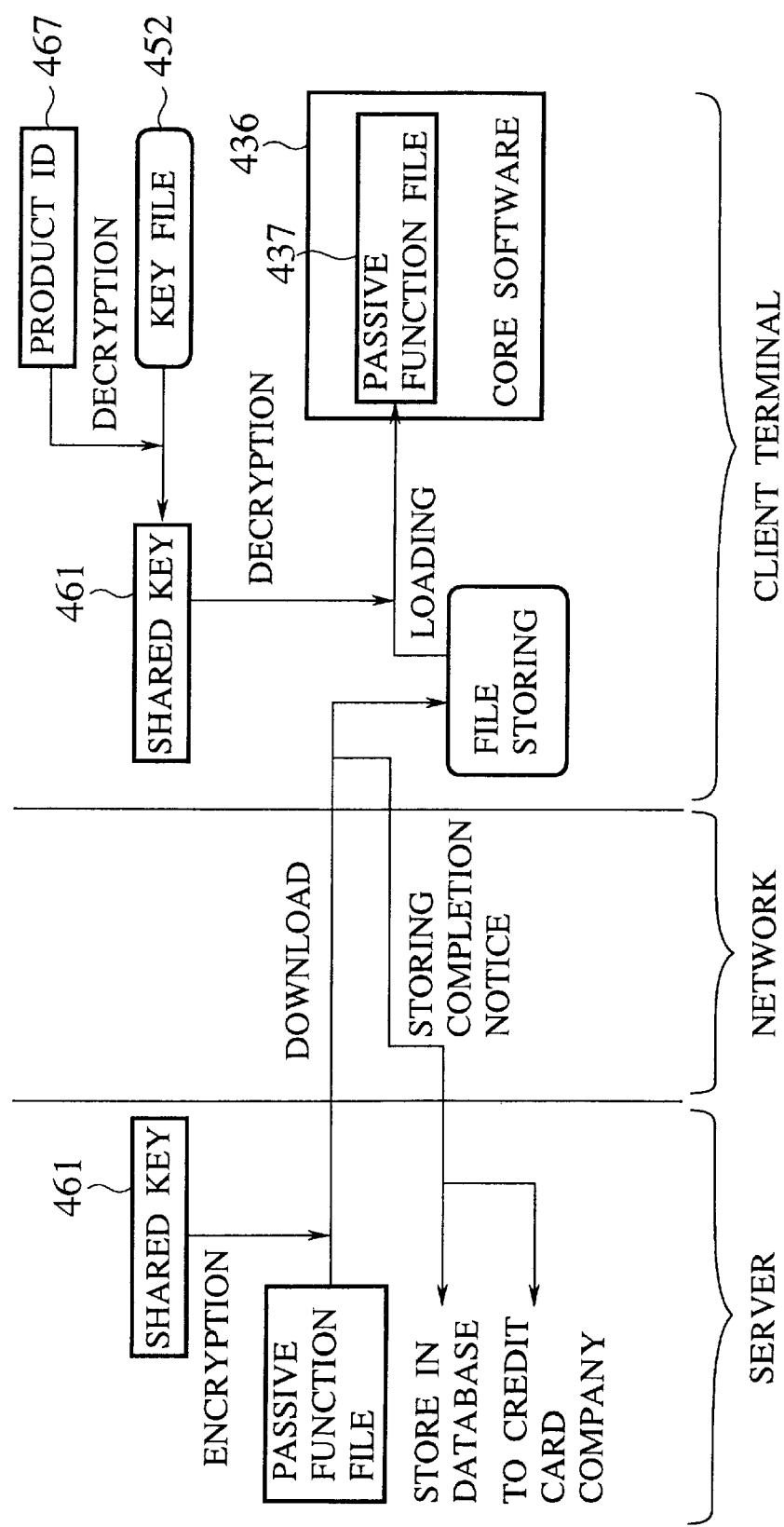
FIG. 10 is a data flow diagram showing an exemplary flow of data at a time of downloading a software product in the software distribution system of FIG. 6.

FIG. 10 shows an exemplary flow of the key data used in the software distribution system of FIG. 6 and an exemplary flow of data at a time of downloading the software product from the server 401.

In the software product to be downloaded from the server 1 to the client terminal 402, the core software is not encrypted and immediately installed at same time as the downloading into the client terminal 402 as already described.

On the other hand, at a time of downloading the passive function file, the server 401 first carries out prescribed user authentication processing and charging processing with respect to a user who made the transmission request for that software, and encrypts the specified passive function file by using the shared key 461 of that user, and then downloads the encrypted passive function file to the client terminal 402.

When the encrypted passive function file is received at the client terminal 402, the encrypted passive function file is stored into a prescribed region (an encrypted software storage unit 441 shown in FIG. 12) in the encrypted form.

When the core software is activated, the core software first decrypts the encrypted shared key 461 stored in the key file 452 by using the product ID 467, and decrypts the encrypted passive function file by using the decrypted shared key 461, and then incorporates the decrypted passive function file into itself.

Now, the features of the software product to be downloaded in the software distribution system of this second embodiment will be described with reference to FIG. 11.

Figure 11:
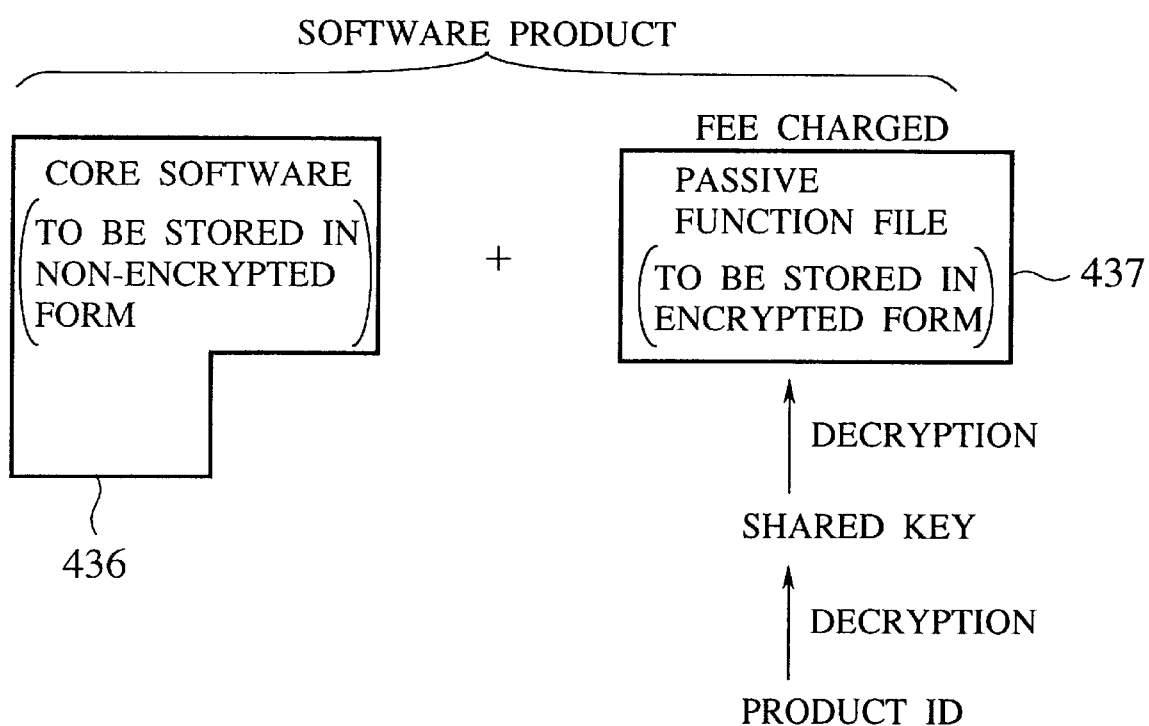
FIG. 11 is a diagram showing a conceptual configuration of a software product in the second embodiment of the present invention.

FIG. 11 shows a conceptual configuration of the software product in this second embodiment. As shown in FIG. 11, the software product generally comprises the core software (active function file) 436 and the passive function file 437.

The core software 436 is a trial sample software in a function and validity limited version, which is operable by itself and which is to be offered for free.

The passive function file 437 is to be provided in response to the user request, and used for a validity limit cancellation and a function addition (including a case of version updating) with respect to the already distributed core software 436. This passive function file 437 is not operable by itself, and can be set operable by being incorporated into the core software 436. The passive function file 437 is a data file or a program file which is normally fee charged, distributed to the client terminal 402 in the encrypted form, and stored in the encrypted form at the client terminal 402.

Also, the core software 436 is normally formed by a plurality of files and usually has a larger size, while the passive function file 437 usually has a relatively smaller size.

Figure 12:
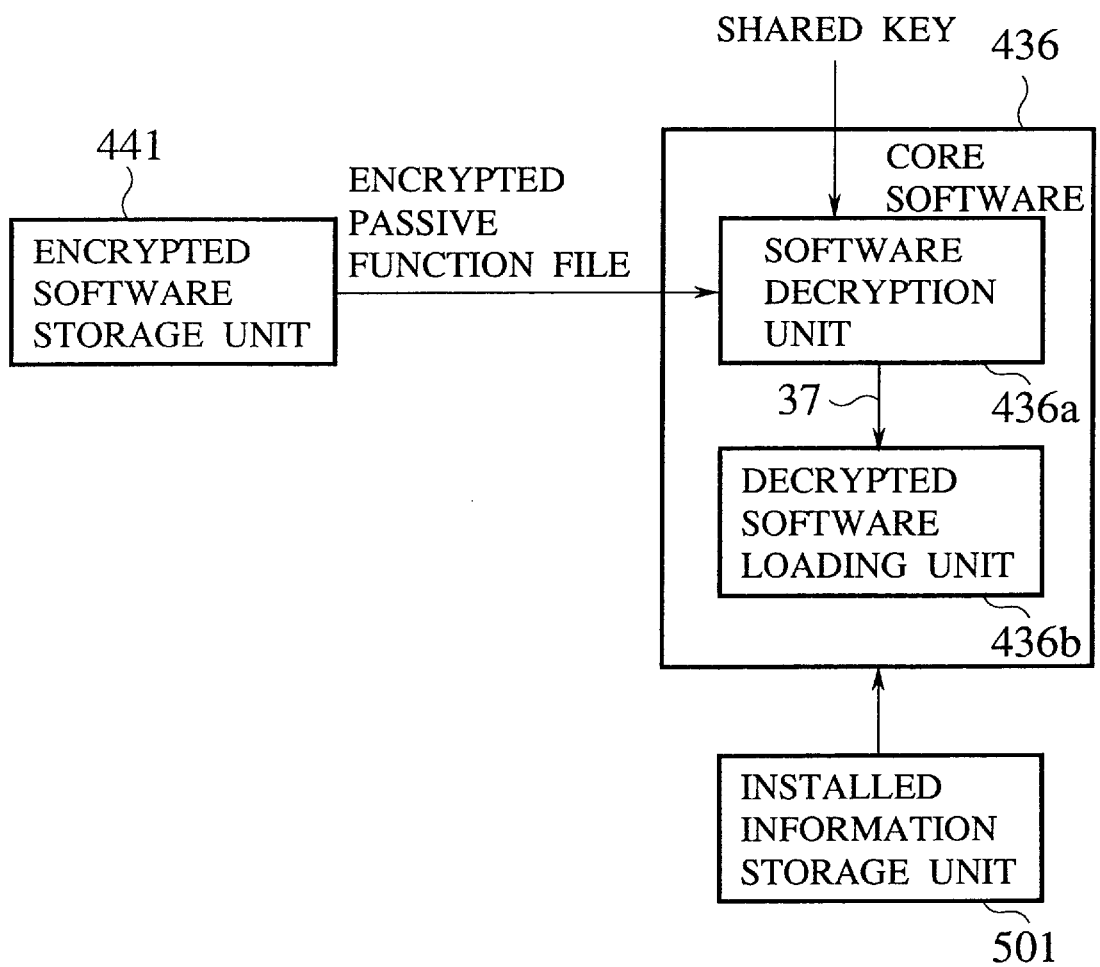
FIG. 12 is a block diagram of a partial configuration of the software distribution system of FIG. 6 for explaining a function of a core software used in the second embodiment of the present invention.

FIG. 12 shows a partial configuration for explaining the function of the core software in this second embodiment.

This core software 436 is not completely operable even when it is installed into the client terminal 402, and further functions can be added to this core software 436 by incorporating the decrypted passive function file 437 into this core software 436.

In other words, even when this software is executed by a person who has no right to decrypt this passive function file 437, not all the functions of the software can be realized.

When the core software 436 is executed, the installed information storage unit 501 is searched through to check whether the passive function file related to this core software 436 is already installed or not. When the related passive function file is already installed, this encrypted passive function file is read out from the encrypted software storage unit 441, decrypted at a software decryption unit 436*a* by using the shared key 461, and the resulting decrypted passive function file 437 is stored into the decrypted software loading unit 436*b*. If the shared key 461 cannot be obtained at this point, correct data cannot be stored into the decrypted software loading unit 436*b*.

The core software 436 verifies that the passive function file 437 stored the decrypted software loading unit 436*b* is the correct data. Here, a method for realizing this verification can be a method for checking whether the passive function file 437 stored in the decrypted software loading unit 436*b* is identical to data anticipated by the core software 435 or not (i.e., whether it is correctly decrypted or not), or a method for executing the passive function file 437 stored in the decrypted software loading unit 436*b* itself as a program, for example.

The advantages of using this software product configuration for separately distributing the core software and the passive function file are as follows.

First, only a charged portion of the software can be sold as the passive function file. For example, the core software can be a word-processor without a printing function and a communication function, and the printing function and the communication function are to be sold as separate charged softwares. Using this scheme, the core software can be distributed for free through a freely accessible medium such as a CD-ROM or an electronic message board from which the core software can be acquired by anyone, and the charged portion can be purchased only when a user is satisfied with a trial use of the core software.

In the conventional mail order sales, there is a system for protecting a customer called a cooling off period during which a customer can return the purchased product for free of charge because the product cannot be checked in advance, but in a case of dealing with the software which is in an intangible form, it is impossible to return the once purchased software. In this regard, it is possible to protect the customer by offering the core software as a sample version for trial use by the consumer, without a need for any cooling off period. After the actual trial use, the customer can purchase the other charged functions (passive function file) only when the customer is satisfied with the trial use. In addition, instead of providing one free portion and one charged portion, it is possible to offer more than one additional functions, so that the customer can purchase only the desired additional functions at appropriate price. In this manner, it is also possible to prevent an unfair trade practice to require the customer to purchase everything including those functions which are actually unnecessary for that customer.

Also, an amount of data involved in the encryption and decryption can be reduced in this application case. In general, the calculation for the encryption or decryption takes a time in proportion to an amount of data involved, so that if a software in a very large size is sold by encrypting it one by one at a time of purchase, it would require a considerable amount of time for the purchase (downloading) and/or the execution (decryption). For this reason, a portion to be encrypted should be kept as small as possible.

Also, the reduction of an amount of data implies that the communication line can be a thin one. In other words, the downloading takes time in general when a communication line between the store and the customer for purchasing the charged information is slow, but if the core software was already distributed by a CD-ROM or acquired through the other high speed network, it suffices to acquire a small passive function file alone, so that the purchase does not take much time.

Moreover, this software product configuration can also be utilized as a measure for preventing the illegal copy. Namely, at the client terminal 402, the shared key 261 to be used in decrypting the passive function file 437 is stored in an encrypted form obtained by using the product ID 467, so that the decrypted passive function file 437 is present on a memory only while the core software 436 is executed. Consequently, even when all of the key file 452, the core software 436, and the encrypted passive function file 437 are copied, it is impossible to execute an illegally copied software unless the product ID 467 is also obtained. Moreover, it is also difficult to make an illegal copy of the software by analyzing the operation mechanism of the software, so that it actually becomes pointless to make an illegal copy by spending much effort and time.

For example, when the software to be sold is in a form of a book, the software will be eventually converted into the character string data in a computer readable format on a memory, so that it is possible to steal such converted data from a memory rather easily. In such a case, the core software 436 can be set as a software for reading the book, which reads the individual software (book) offered as the passive function file 437 and displays a content of the individual software on a screen. Then, by adopting a mechanism in which the core software 436 decrypts and displays the necessary data (encrypted data) whenever a need arises, it becomes quite difficult to read out all the book data (characters) together.

In addition, the decrypted passive function file 437 is going to be present on a memory only while the core software 436 is executed, so that when a procedure for the core software 436 to utilize the passive function file 437 is made very tedious, it is possible to improve the safety because it would require a considerable amount of effort and time to break the encryption of the software.

In general, a software to be sold through a network is often a software which requires rather frequent version updating or an information with only a temporal value (such as a weather forecast information), so that when the safety level of the software is made very high, it becomes much more economical to purchase the software legitimately by paying the proper price rather than spending much effort and time to produce illegal copies of the software. Consequently, when the safety level is made very high, it becomes pointless to commit the illegal act, and the fair distribution of the software will be promoted.

Next, with reference to FIG. 13, the detailed processing procedure at a time of downloading a desired software from the server 401, i.e., the processing procedure of the download program function unit 432, will be described.

First, the user activates the browser of the client terminal 402, for example, and makes an access to the server 401 by manipulating the mouse and requests a desired software to the server 401. At this point, the client terminal 402 obtains an information on the environment of the client terminal 402 such as a type and a version of OS, a type of browser, etc., and transmits this information to the server 401 as an automatic environment judgement result. This automatic environment judgement result is provided as an option at a time of requesting the software. A function for obtaining and transmitting this information on the environment is usually provided in the browser for general use (step S1).

At the install list transmission function unit 415 of the server 401 which received this transmission request, an install list (a list describing which file should be installed how) corresponding to the software specified by the user is read out from the install list storage unit 425 and transmitted to the client terminal 402 (step S2).

At this point, the server 401 knows the environment of the client terminal 402 according to the automatic environment judgement result received from the client terminal 402 as an option, so that the server 401 can change the install list to be transmitted to the client terminal 402 according to the environment of the client terminal 402. For example, for the client terminal 402 using a specific OS, the install list of softwares that can be operated by that specific OS will be transmitted.

FIG. 14 shows an exemplary data configuration transmitted from the server 401 at this point, which generally comprises a header portion and a data portion.

The header portion contains an identification information 471 (Content-type: Application/ABC) such that the download program will be automatically activated when this identification information 471 is detected at the client terminal 402. (This setting is already made when the registration software function unit 431 installs the download program.)

The data portion has an install list inserted therein in this example. As shown in FIG. 14, the install list is formed by the latest version of the download program (Download-version), an address information for the server 401 (URL, for example). and a plurality of commands.

The commands are used for notifying functions selected by the user's clicking of the mouse to the download program. For example, there is an install command (either for the core software or the passive function file) as shown in FIG. 15, which describes which file should be installed how. A concrete example of such an install command is shown in FIG. 16.

The install command shown in FIG. 16 indicates that "Revision 3" of "dic2" function of "version 1" of the file lame "MT" is required, and this file should be transmitted in three divided parts, where an amount of transmission is 512 Kbytes for the first one and the second one, while it is 139 Kbytes for the third one, and a total capacity of a file obtained by concatenating and de-compressing these three parts is 7439 Kbytes. Using such an install command as shown in FIG. 15, it becomes possible to download the software in divisions. Note that the collective download can also be specified by setting "n=1" in the division specification field of FIG. 15.

The commands also includes a command for displaying a version updating information for the software purchased by the user. If a file specified in this command is not installed, this command sets an execution of a subsequent install command as an error. This is used at a time of selling the passive function file, in order to confirm that the corresponding core software is already installed and normally operating.

Next, when the install list transmitted from the server 401 at the step S2 is received, the client terminal 402 detects the identification information 471 contained in the header portion of FIG. 14 and activates the download program. Then, the latest version (Download-version) of the download program contained in the received install list is checked (step S3). It the latest version has been updated, the download of the download program in the latest version is requested to the server 401 (step S4). In response, the server 401 reads out a file of the download program in the latest version from a prescribed software storage unit, and downloads this file into the client terminal 402 without encrypting this file (step S5).

When a file of the download program in the latest version is received at the client terminal 402, the downloading of this file is handled differently from the downloading of the other files. Namely, the currently executed download program is not to be overwritten, and when the currently executed download program is installed under a name of "download1", for example, the download program in the latest version is installed under a name of "download2", and a setting file for realizing the automatic execution of the download program is also rewritten. Then, data processed by the currently executed download program "download1" are given to the download program in the latest version "download2" as they are, and the download program in the latest version is activated. Consequently, after the version updating, there are always two program files "download1" and "download2".

The reason for handling this version updating to the download program in the latest version differently from the downloading of the other files is that the processing contents of the currently executed download program are not going to be renewed even when a new file is overwritten onto the currently executed download program.

Next, at the client terminal 402, the version information for the files (core software, passive function file) constituting the software specified by the user which is described in the install list is compared with the version information for the file registered in the installed information storage unit 501, so as to check whether there is any file whose version has been updated, or whether there is any new additional function file (passive function file) in the install list. When such a file exists, a download request with a prescribed header information for the necessary file attached thereto is transmitted to the server 401 (step S6).

Here, the download request contains an information on the version of the currently installed file, for example. Also, the header information includes an information (such as the purchase key, for example) for indicating that the user registration is already completed.

Figure 17:
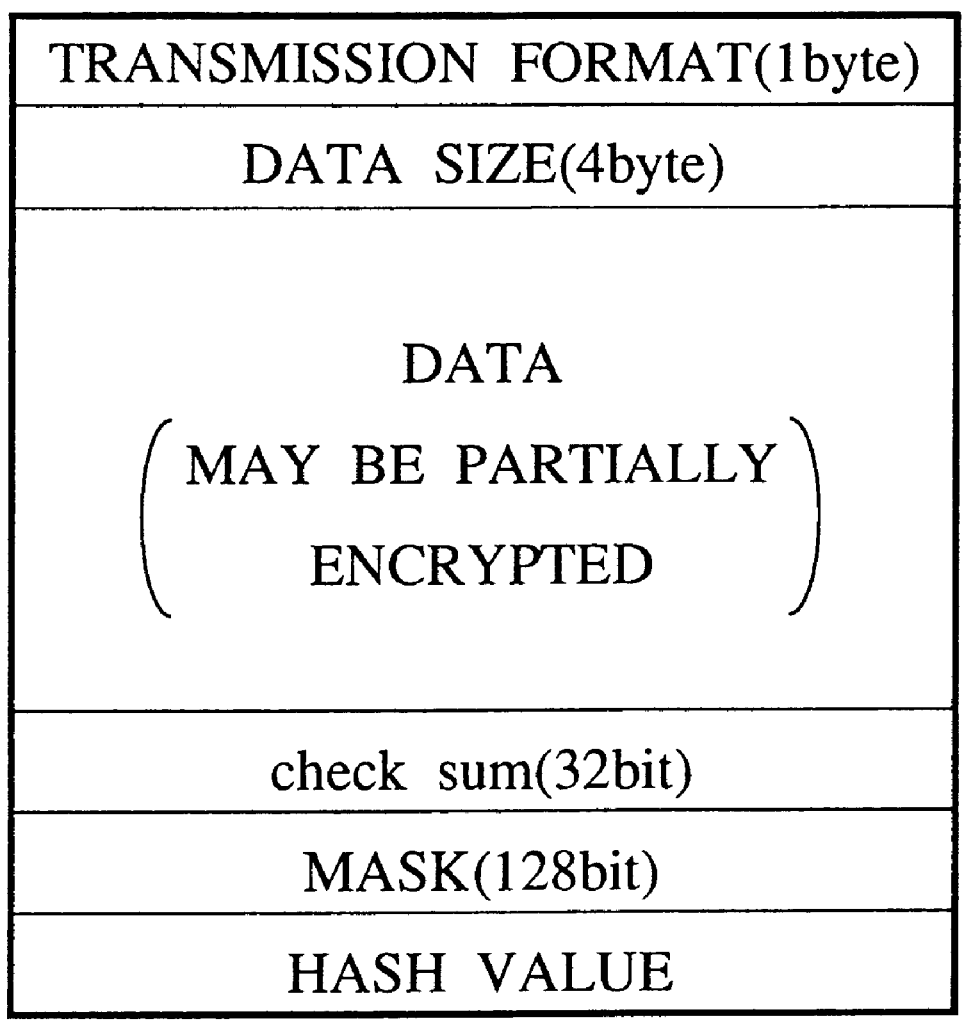
FIG. 17 is a diagram showing an exemplary data format for downloading a requested file in the second embodiment of the present invention.

When the server 401 receives the download request from the client terminal 402, and recognizes that this user is an already registered user according to the header information of the download request, the processing for the received download request is executed, and the downloading of the specified file is carried out in a format shown in FIG. 17 (step S7).

In FIG. 17, a type of data to be transmitted is described in a "transmission format" field. For example, "0" indicates a collective transmission of an entire file, "1" indicates a collective transmission of a remainder of data, "2" indicates a transmission of an entire file in divisions, and "3" indicates a transmission of a remainder of data in divisions.

Also, a file to be inserted into a "data" field may be compressed by a prescribed compression program. In such a case, the de-compression program may be contained in the download program or may be provided as an external program to be read separately.

Also, a "data size" field indicates a size of data in the "data" field, a "MASK" field indicates a mask to be applied to the shared key, a "check sum" field indicates a check sum with respect to the data (non-encrypted) in the "data" field, and a "hash value" field indicates a hash value obtained by applying the hash function on all of the data size, data, check sum, and MASK field contents. Here, the hash value is used so that the download program can detect an error when the hash value is not correct. Note that, when the "MASK" field has "0", it implies that the file in the "data" field of this format is not to be encrypted.

At the server 401, after the file is transmitted, if the transmitted file is a fee charged one, the credit card number of this user is obtained by referring to the personal information file storage unit 424 by using the purchase key as a search key, and the credibility inquiry to the credit card company and the charging processing are carried out according to the obtained credit card number.

Also, at a time of downloading, a part which is required to be encrypted is encrypted by the pre-registered shared key.

Here, if the download fails in a middle (for a reason such as a disconnection of a communication line, for instance) while the charging is successfully made, this download failure can be simply ignored. It suffices to carry out the downloading again without carrying out the charging processing when this user makes the same purchase operation again.

Now, the various effects of the software distribution system in this second embodiment as described above will be summarized.

(1) Automatic Install Function:

The automatic environment judgement result obtained at the client terminal 402 is transmitted to the server 401, and the server 401 distributes the suitable software according to this automatic environment judgement result. Then, at the client terminal 402, the downloaded file is installed immediately when it is received, by the installer provided in the download program. In this manner, the install can be realized easily and surely even when the user does not have a thorough knowledge of the personal computer.

In addition, at a time of automatically installing the file downloaded from the server 401, the download program at the client terminal 402 executes the processing by recognizing the identification information set at a time of the user registration, so that there is no danger for introducing a computer virus.

(2) Automatic Charging Function:

An information such as a credit card number is registered in the server 401 at a time of the user registration, so that at a time of purchasing the software, it suffices to transmit only a purchase request for a desired software. Then, by utilizing the on-line credibility inquiry using the registered credit card number, the charging is immediately carried out at the server 401. Consequently, the user is only required to make some mouse clicking in purchasing the software, so that this scheme is suitable for the sales of cheap softwares. In addition, there is no need to enter the credit card number at every occasion of purchase, so that the safety level is improved.

(3) Automatic Version Updating Function:

The download program at the client terminal 402 checks whether a version of a file already installed into that terminal has been updated or not by referring to the install list transmitted from the server 401, and a result of this checking is presented to the user. According to this checking result, the user can easily makes the download request for the necessary file by simply manipulating the mouse. In addition, only the necessary portion is downloaded from the server 401, so that an amount of communication can be reduced and the communication line cost can be saved.

(4) Trial Use of Software:

The user is allowed to make a trial use of a free trial sample version (core software) of the software first, and then the user purchases a fee charged software portion (passive function file) for enabling the regular operation which is to be incorporated into the core software. Consequently, a trouble or dissatisfaction regarding the purchased software product can be eliminated, so that this scheme is suitable for the sales of electronic information which is not returnable.

(5) Illegal Copy Prevention Function:

The fee charged software portion (passive function file) is stored in an encrypted form at a time of being downloaded from the server 401 and installed into the client terminal 402, and this passive function file is decrypted by a decryption and incorporation function of the core software at a time of each software activation in order to convert the software into an executable form. Here, the shared key uniquely assigned to the user is used in the decryption, and this shared key is stored in an encrypted form obtained by using the product ID which is uniquely defined at the client terminal 402. Consequently, even when all of the key file 452, the core software 436, and the encrypted passive function file 437 are illegally copied, it is impossible to execute the illegally copied software unless the product ID is also obtained.

(6) Version Updating for Download Program:

The download program at the client terminal 402 checks a version information for the download program which is described in the install list transmitted from the server 401, and automatically requests the download of the download program in the latest version to the server 401 if the version has been updated, in this manner, the version updating of the download program can be realized easily, and consequently an addition of types of commands to be described in the install list becomes easier.

(7) Software Downloading in Divisions:

In a case of downloading the software in a large size, the server 401 can try to transmit such a software in divisions. Namely, the downloading in divisions is commanded by the install command described in the install list in such a case. In this manner, when the downloading falls as a trouble occurs in the communication line between the server 401 and the client terminal 402, a procedure to retry the downloading can be made simpler.

Note that, in the above description, it is assumed that the passive function portion of the software is to be sold as a fee charged software, but this second embodiment is not necessarily limited to this case, and the passive function portion can be provided as a free additional function to the active function portion. In such a case, it is not absolutely necessary to carry out the encryption of the passive function portion.

It is to be noted that, in the present invention described above, the encryption/decryption by using the shared key is not necessarily limited to the encryption/decryption using the shared key as encryption/decryption key. For example, it is possible to provide a table of correspondence between the shared key and a separate key for encryption/decryption, where the correspondence is guaranteed in some suitable manner, and carry out the actual encryption/decryption by using this separate key (which is related to the shared key) instead of using the shared key itself. This meaning of the encryption/decryption by using the shared key is intended in the appended claims as well, so that the encryption/decryption by using the shared key should be construed to cover not only a case of carrying out the actual encryption/decryption using the shared key itself as encryption/decryption key, but also a case of carrying out the actual encryption/decryption using a key data related to the shared key as encryption/decryption key.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for utilizing software, comprising the steps of:

carrying out a user registration by generating a shared key at a user side and storing the shared key at both a software provider side and the user side before any request for a software is issued from the user to the software provider, the shared key having a guaranteed correspondence with an ID information regarding a payment of a software fee by the user;

requesting a desired software from the user to the software provider by using the shared key, and receiving the desired software in an encrypted form using the shared key from the software provider;

decrypting the desired software received from the software provider by using the shared key stored at the user side; and utilizing the desired software in a decrypted form.

2. The method of claim 1, wherein the guaranteed correspondence between the shared key and the ID information is established by the steps of:

encrypting the shared key at the user side by using a public key corresponding to a secret key of the software provider and sending the shared key in an encrypted form from the user side to the software provider; and encrypting the ID information at the user side by using the shared key and sending the ID information in an encrypted form from the user side to the software provider.

3. The method of claim 1, wherein the guaranteed correspondence between the shared key and the ID information is established by encrypting the shared key and the ID information at the user side by using a public key corresponding to a secret key of the software provider and sending the shared key and the ID information in an encrypted form from the user side to the software provider.

4. The method of claim 1, wherein the carrying out step stores the shared key at the user side by obtaining an auxiliary information regarding a software utilization, encrypting the shared key by using the auxiliary information, and storing the shared key in an encrypted form, and the decrypting step decrypts the desired software by obtaining the auxiliary information, decrypting the shared key in an encrypted form by using the auxiliary information, and decrypting the desired software by using the shared key in a decrypted form.

5. The method of claim 1, wherein the utilizing step utilizes the desired software in executing another already provided software.

6. A software distribution system in which a desired software is provided in an encrypted form from a software provider to a user, comprising:

a shared key generation unit provided at the user side and configured to generate a shared key, the shared key having a guaranteed correspondence with an ID information regarding a payment of a software fee by the user;

shared key storing units respectively provides at both a software provider side and a user side and configured to store the shared key before any request for a software is issued from the user to the software provider;

a request transmission unit provided at the user side and configured to transmit a request for the desired software to the software provider side by using the shared key stored in the shared key storage unit on the user side;

a software encryption unit provided at the software provider side and configured to encrypt the desired software by using the shared key stored in the shared key storage unit on the software provider side;

an encrypted software transmission unit provided at the software provider side and configured to transmit the desired software in an encrypted form to the user side; and a software decryption unit provided at the user side and configured to receive the desired software in an encrypted form from the software provider, and to decrypt the desired software received from the software provider by using the shared key stored in the shared key storage unit on the user side, so as to obtain the desired software in a decrypted form that can be utilized at the user side.

7. The system of claim 6, further comprising:

a request inspection unit provided at the software provider side and configured to inspect whether the request for the desired software is proper or not by using the shared key stored in the shared key storage unit on the software provider side; and a software transmission command unit provided at the software provider side and configured to command an execution of an encryption by the software encryption unit and a transmission by the encrypted software transmission unit when the request inspection unit judges that the request for the desired software is proper.

8. The system of claim 6, further comprising:

a shared key encryption unit provided at the user side and configured to encrypt the shared key by using a public key corresponding to a secret key of the software provider and to send the shared key in an encrypted form to the software provider; and an ID information encryption unit provided at the user side and configured to encrypt the ID information by using the shared key and to send the ID information in an encrypted form to the software provider, so as to establish the guaranteed correspondence between the shared key and the ID information.

9. The system of claim 6, further comprising:

a shared key and ID information encryption unit provided at the user side and configured to encrypt the shared key and the ID information by using a public key corresponding to a secret key of the software provider and to send the shared key and the ID information in an encrypted form to the software provider, so as to establish the guaranteed correspondence between the shared key and the ID information.

10. The system of claim 6, wherein the shared key storage unit on the user side stores the shared key by obtaining an auxiliary information regarding a software utilization, encrypting the shared key by using the auxiliary information, and storing the shared key in an encrypted form, and the software decryption unit decrypts the desired software by obtaining the auxiliary information, decrypting the shared key in an encrypted form by using the auxiliary information, and decrypting the desired software by using the shared key in a decrypted form.

11. A software distribution system in which a desired software is provided from a software provider to a user through a network comprising:

a client terminal on a user side, which is connected with a server on a software provider side through the network, and including;

a registration unit configured to generate a shared key and register a user charging information and the shared key into the server such that the shared key is stored at both the software provider side and the user side before any request for a software is issued from the user to the software provider;

a request unit configured to send a request for a desired software to the server; and an install unit configured to install each software downloaded from the server in response to the request sent by the request unit; and a server on the software provider side, including:

a charging processing unit configured to carry out a charging processing according to the user charging information registered by the registration unit, when the desired software requested by the request is a fee charged software; and a download unit configured to download software in response to the request sent by the request unit, the software to be download being encrypted by using the shared key registered by the registration unit when the software to be downloaded is required to be encrypted.

12. The system of claim 11, wherein each software provided by the software provider comprises an active function portion which is independently operable and which is provided from the server for free at a time of a software purchase by the user, and a passive function portion which becomes operable by being incorporated into the active function portion and which is fee charged, and the charging processing unit carries out the charging processing when the request sent by the request unit is requesting the passive function portion.

13. The system of claim 11, wherein each software provided by the software provider comprises an active function portion which is independently operable, and a passive function portion which becomes operable by being incorporated into the active function portion, the downloading unit downloads the passive function portion in an encrypted form obtained by using the shared key; and the install unit installs the passive function portion and the active function portion so that, the passive function portion installed by the install unit is stored in an encrypted form, and the active function portion installed by the install unit decrypts the passive function portion in an encrypted form by using the shared key and incorporates the passive function form in a decrypted form, each time the active function portion is activated at the client terminal.

14. The system of claim 11, wherein the client terminal further comprises:

a key management unit configured to encrypt the shared key by using a code information uniquely defined for the client terminal, and to store the shared key in an encrypted form.

15. The system of claim 11, wherein the download unit downloads a software which is selected according to an environment judgement result for the client terminal notified from the client terminal to the server in advance.

16. The system of claim 11, wherein the server further comprises:

a list providing unit configured to provide the user with a list information containing a version information for each software that can be provided to the user, in response to a request for the list information from the client terminal, so that the request sent by the request unit requests the desired software selected according to the list information.

17. A method of purchasing a software at a user-side computer, comprising the steps of:

carrying out a user registration by generating a shared key at a user side and storing the shared key at both a software provider side and the user side, the shared key being guaranteed to correspond to an ID information of the user regarding a payment of a software fee;

receiving, in response to a request for a desired software by the user using the shared key, the desired software in a form encrypted using the shared key from the software provider, without requiring the user to give the ID information to the software provider; and decrypting the desired software received from the software provider using the shared key stored at the user side.

18. The method of claim 17, further comprising the step of:

receiving, in response to another request for another desired software by the user, the another desired software in a form encrypted using the shared key from the software provider.

19. The method of claim 17, further comprising the step of:

storing another shared key shared between another software provider and the user, the another shared key being guaranteed to correspond to the ID information, without storing the ID information in the user-side computer.

20. A method of selling a software at a provider-side computer, comprising the steps of:

registering a user at a software provider side by storing a shared key generated at a user side, the shared key being guaranteed to correspond to an ID information of the user regarding a payment of a software fee;

receiving a request of a desired software from the user using the shared key, where the request is not accompanied by the ID information; and transmitting, in response to the request, the desired software in a form encrypted using the shared key stored at the software provider side.

* * * * *